United States Patent
Ishihara

(10) Patent No.: US 8,593,741 B2
(45) Date of Patent: Nov. 26, 2013

(54) OPTICAL SYSTEM AND IMAGE PICKUP APPARATUS USING THE SAME

(75) Inventor: Keiichiro Ishihara, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 127 days.

(21) Appl. No.: 13/260,630

(22) PCT Filed: Apr. 8, 2010

(86) PCT No.: PCT/JP2010/002564
§ 371 (c)(1),
(2), (4) Date: Sep. 27, 2011

(87) PCT Pub. No.: WO2010/116741
PCT Pub. Date: Oct. 14, 2010

(65) Prior Publication Data
US 2012/0019937 A1   Jan. 26, 2012

(30) Foreign Application Priority Data
Apr. 10, 2009   (JP) ................. 2009-096140

(51) Int. Cl.
*G02B 9/04* (2006.01)
(52) U.S. Cl.
USPC ........... 359/793; 359/652; 359/707; 359/737; 359/754
(58) Field of Classification Search
USPC ................. 359/642, 652, 707, 737, 754–797
See application file for complete search history.

(56) References Cited

U.S. PATENT DOCUMENTS

| | | | |
|---|---|---|---|
| 4,457,590 A | 7/1984 | Moore | |
| 5,117,308 A | 5/1992 | Tsuchida et al. | |
| 5,166,827 A | 11/1992 | Noda | |
| 5,359,456 A | 10/1994 | Kikuchi | |
| 5,366,939 A | 11/1994 | Kurasawa et al. | |
| 7,136,237 B2 * | 11/2006 | Ogawa | 359/642 |
| 7,660,050 B2 * | 2/2010 | Sato et al. | 359/716 |
| 2007/0133100 A1 * | 6/2007 | Maetaki | 359/642 |
| 2007/0291378 A1 * | 12/2007 | Kron et al. | 359/784 |
| 2008/0130141 A1 * | 6/2008 | Ishibashi | 359/774 |
| 2008/0239510 A1 | 10/2008 | Sato et al. | |
| 2008/0278823 A1 * | 11/2008 | Peuchert et al. | 359/664 |
| 2009/0284847 A1 * | 11/2009 | Ishibashi | 359/785 |

FOREIGN PATENT DOCUMENTS

| | | | |
|---|---|---|---|
| JP | 58-122512 A | 7/1983 | |
| JP | 5-088003 A | 4/1993 | |
| JP | 5-107471 A1 | 4/1993 | |
| JP | 2008-241999 A | 10/2008 | |

OTHER PUBLICATIONS

XP002450003, "Refractive index (nd) as a function of the constringence (nu d) for the sodium d-line [nd=nd (nu d)] for the commercially available optical glasses from Schott AG", 1996, Schott AG, Germany, 1 page.

(Continued)

*Primary Examiner* — Evelyn A. Lester
(74) *Attorney, Agent, or Firm* — Canon U.S.A. Inc. IP Division

(57) ABSTRACT

An optical system includes a positive lens unit, wherein the positive lens unit includes an optical element containing a base material and minute particles that are mixed with the base material and have Abbe number that is lower than that of the base material, and the minute particles are higher in density at a peripheral portion of the optical element than on an optical axis of the optical element.

13 Claims, 18 Drawing Sheets

(56) References Cited

OTHER PUBLICATIONS

XP002677293, "Optical Constants of ZnO (Zinc Oxide), Refractive Index of Zno (Zinc Oxide)," Handbook of Optics, 2nd Edition, vol. 2, McGraw-Hill, 1994, 2 pages.

XP002677294, "Optical Constants of TiO2 (Titanium Dioxide, Rutile), Refractive Index of TiO2 (Titanium Dioxide, Rutile)", Handbook of Optics, 3rd Edition, vol. 4 McGraw-Hill, 2009, 2 pages.

European Office Action in correspondence to counterpart Application EP 10 761 445.5-1553 dated Feb. 21, 2013.

\* cited by examiner

OPTICAL SYSTEM AND IMAGE PICKUP APPARATUS USING THE SAME

TECHNICAL FIELD

The present invention relates to an optical element using a nanocomposite material and, particularly, to an optical system suitable for an image pickup system and an eyepiece system.

BACKGROUND ART

It has heretofore been known that an effective aberration correction is attained by providing a lens with a desired refractive index distribution (gradient refractive index). Particularly, a radial-type refractive index distribution in which a refractive index is changed depending on a distance from an optical axis of the lens achieves a light collecting action by the refractive index distribution and exhibits a great effect on the aberration correction.

U.S. Pat. No. 4,457,590 discusses a single lens having the radial-type refractive index distribution. The refractive index of the single lens changes according to a fourth-order power series expansion formula depending on the distance in a radial direction from the optical axis, thus correcting spherical aberration and coma aberration well by maintaining coefficients of the power series expansion formula to desired values.

U.S. Pat. No. 5,359,456 discusses an example of using a lens having the radial-type refractive index distribution as a part of an endoscope objective lens. The lens includes, in order from the object side, a front group divergent system having a negative power and a rear group convergent system having a positive power, and at least one of the divergent system is a gradient index lens.

U.S. Patent Application Publication No. 2008/0239510 discusses an optical element using a nanocomposite material obtainable by mixing an optical resin (base material) with minute particles (nanoparticles). It is discussed in U.S. Patent Application Publication No. 2008/0239510 that a nanocomposite resin material of which a refractive index is improved by the nanoparticles is suitable as a high refractive index material.

In U.S. Pat. No. 4,457,590, U.S. Pat. No. 5,359,456, and U.S. Patent Application Publication No. 2008/0239510, although it is discussed that minute particles of metal or the like are mixed with the base material for attaining a distribution of refractive index or improving the refractive index, it is not discussed that the minute particles are mixed for the purpose of attaining a distribution of Abbe number.

U.S. Pat. No. 5,366,939 discusses an example of forming a distribution in which Abbe number is increased along with an increase in refractive index by distributing a first metal species with a gradient and distributing a second metal species substantially flatly in a medium.

However, since Abbe number variation Dvd attained with the configuration discussed in U.S. Pat. No. 5,366,939, which is 3.1, is small, a chromatic aberration correction effect thereof is not sufficient.

CITATION LIST

Patent Literature

PTL 1: U.S. Pat. No. 4,457,590
PTL 2: U.S. Pat. No. 5,359,456
PTL 3: U.S. Patent Application Publication No. 2008/0239510
PTL 4: U.S. Pat. No. 5,366,939

SUMMARY OF INVENTION

The present invention is directed to an optical system in which chromatic aberration is reduced well.

According to a first aspect of the present invention, there is provided an optical system including a positive lens unit, wherein the positive lens unit includes an optical element containing a base material and minute particles that are mixed with the base material and have Abbe number that is lower than that of the base material, and the minute particles are higher in density at a peripheral portion of the optical element than on an optical axis of the optical element.

According to a second aspect of the present invention, there is provided an optical system including a negative lens unit, wherein the negative lens unit includes an optical element containing a base material and minute particles that are mixed with the base material and have Abbe number that is lower than that of the base material, and the minute particles are lower in density at a peripheral portion of the optical element than on an optical axis of the optical element.

According to a third aspect of the present invention, there is provided an optical system including a stop, a first lens unit located closer to an object side than the stop, and a second lens unit located closer to an image side than the stop, wherein the first lens unit includes an optical element containing a base material and minute particles that are mixed with the base material and have Abbe number that is lower than that of the base material, and the minute particles are lower in density at a peripheral portion of the optical element than on an optical axis of the optical element.

According to a fourth aspect of the present invention, there is provided an optical system including a stop, a first lens unit located closer to an object side than the stop, and a second lens unit located closer to an image side than the stop, wherein the second lens unit includes an optical element containing a base material and minute particles that are mixed with the base material and have Abbe number that is lower than that of the base material, and the minute particles are higher in density at a peripheral portion of the optical element than on an optical axis of the optical element.

In addition, the present invention is applicable to an optical apparatus such as an image pickup apparatus and an image projection apparatus including the optical system according to any one of the first to fourth aspects.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Various exemplary embodiments, features, and aspects of the invention will be described in detail below with reference to the drawings.

Each of exemplary embodiments of the present invention is directed to an optical system in which chromatic aberration is reduced well by using an optical element obtained by mixing minute particles with a base material.

According to the exemplary embodiments of the present invention, the optical element using the nanocomposite material contains a base material and nanoparticles (minute particles having a particle diameter of 30 nm or less, preferably 10 nm or less) having Abbe number that is lower than that of the base material. In the optical element, the density of the minute particles contained in the base material changes along a radial direction about an optical axis of the optical element.

The density of the nanoparticles is higher at the peripheral portion than on the optical axis when the power of an optical element group including the optical element is positive, while the density of the nanoparticles is lower at the peripheral portion than on the optical axis when the power of the optical element group is negative. The optical element group may include a plurality of lens elements or may be formed of a single lens element and may be referred to as a lens unit, a lens group, or an optical unit.

Hereinafter, the optical element using the nanocomposite material according to the present exemplary embodiments will be described. It is possible to realize optical characteristics that are different from those of optical plastic materials by using the nanocomposite material obtained by dispersing nanoparticles into an optical plastic material (base material which is not limited to plastic). It is possible to obtain optical characteristics such as a high refractive index and low dispersion by using the nanocomposite material as compared to the conventional ion exchange method.

It is possible to form a refractive index distribution in the optical element using the nanocomposite material by varying the density (volume ratio) of nanoparticles (metal oxide) with location in an optical resin material serving as the base material.

Figure 19:
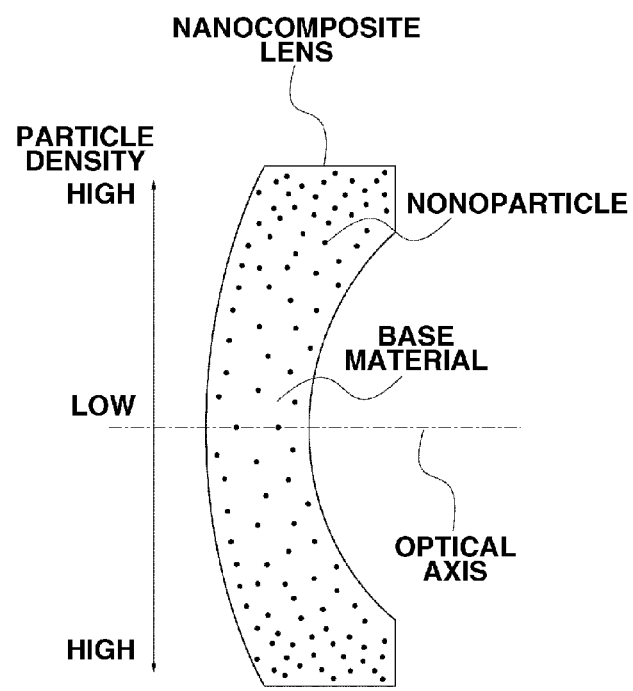
FIG. 19 is a schematic diagram illustrating a nanocomposite lens.

Illustrated in FIG. 19 is a schematic diagram of a nanocomposite lens obtained by mixing nanoparticles with a base material of a negative meniscus lens, in which the density of nanoparticles is increased as the distance from the optical axis increases.

In the case of forming a refractive index distribution by using nanoparticles having a larger refractive index than that of a base material, it is possible to form the refractive index distribution in which the refractive index is gradually increased from the optical axis to a peripheral portion of the optical element by keeping the base material as it is on the optical axis and gradually increasing the density (volume ratio) of the nanoparticles as the distance from the optical axis increases, for example.

It is generally considered that the optical characteristics follow the Maxwell-Garnett theory expressed in Equation (1), and an average electric permittivity Eav is determined from an electric permittivity Em of the base material, an electric permittivity Ep of the nanoparticles, and a volume ratio h of the nanoparticles.

$$Eav=Em\{1+[3h(Ep-Em)/(Ep+2Em)]/\{1-h(Ep-Em)/(Ep+2Em)\}] \quad (1)$$

In other words, an average refractive index Nav is determined from a refractive index Nm of the base material, a refractive index Np of the nanoparticles, and a volume ratio h of the nanoparticles as expressed in Equation (2).

$$Nav^2=Em[1+\{3h(Np^2-Nm^2)/(Np^2+2Nm^2)/(1-h(Np^2-2Nm^2)\}] \quad (2)$$

As described above, it is possible to change the average refractive index Nav by changing the volume ratio h of the nanoparticles. In short, it is possible to form a radial-type refractive index distribution optical element by forming a density gradient of the nanoparticles along with the increase in distance from the optical axis.

Meanwhile, the refractive indexes of the base material and the nanoparticles vary wavelengths.

It is possible to detect refractive indexes at various wavelengths at various positions of the optical element by assigning the refractive indexes of the base material and the nanoparticles varied by the wavelengths to the Maxwell-Garnett theory of Equation (2). Particularly, since spectral lines are important, refractive indexes with respect to C-line (656.27 nm), d-line (587.56 nm), F-line (486.13 nm), and g-line (435.835 nm) at the various positions are calculated.

A distance from the optical axis is represented by r, and the refractive indexes with respect to C-line, d-line, and F-line used above at the distance r from the optical axis are represented by $N_C(r)$, $N_d(r)$, and $N_F(r)$, respectively. Abbe number vd(r) at the distance r from the optical axis is represented by a relationship expressed in Equation (3).

$$vd(r)=\{N_d(r)-1\}/\{N_F(r)-N_C(r)\} \quad (3)$$

In the case of using the nanoparticles having Abbe number different from that of the base material, the Abbe number changes along with a change in volume ratio h of the nanoparticles. Therefore, it is possible to form a radial-type Abbe number distribution optical element by forming a density gradient of the nanoparticles depending on the distance from the optical axis.

Abbe number variation Dvd is given by Equation (4) when Abbe number on the optical axis of the optical element is represented by vd(ct) and Abbe number at the peripheral portion of the optical element is represented by vd(ed).

$$Dvd=vd(ed)-vd(ct) \quad (4)$$

Superiority of the material is determined by how large the Abbe number variation (Dvd) is.

Accordingly, comparison between sizes of Abbe number variations of a nanocomposite material obtained by mixing a base material with nanoparticles having higher Abbe number than the base material and a nanocomposite material obtained by mixing a base material with nanoparticles having lower Abbe number than the base material was conducted. The refractive indexes at various wavelengths of the nanocomposite materials were in conformity with the relationship expressed in Equation (2).

Polymethylmethacrylate (PMMA) resin (Nd=1.492, vd=57.2), which is a typical optical resin, was used as the base material, and the following three types were used as the nanoparticles. Titania TiO2 (Nd=2.761, vd=9.5) was used as Nanoparticles 1. Hypothetical nanoparticles (Nd=1.492, vd=9.5) having the same refractive index as PMMA and the same Abbe number as titania were used as Nanoparticles 2. Hypothetical nanoparticles (Nd=1.492, vd=104.9) having the same refractive index as PMMA and Abbe number that is higher than that of Nanoparticles 2 by a difference in Abbe number between Nanoparticles 2 and titania were used as Nanoparticles 3.

Figure 20:
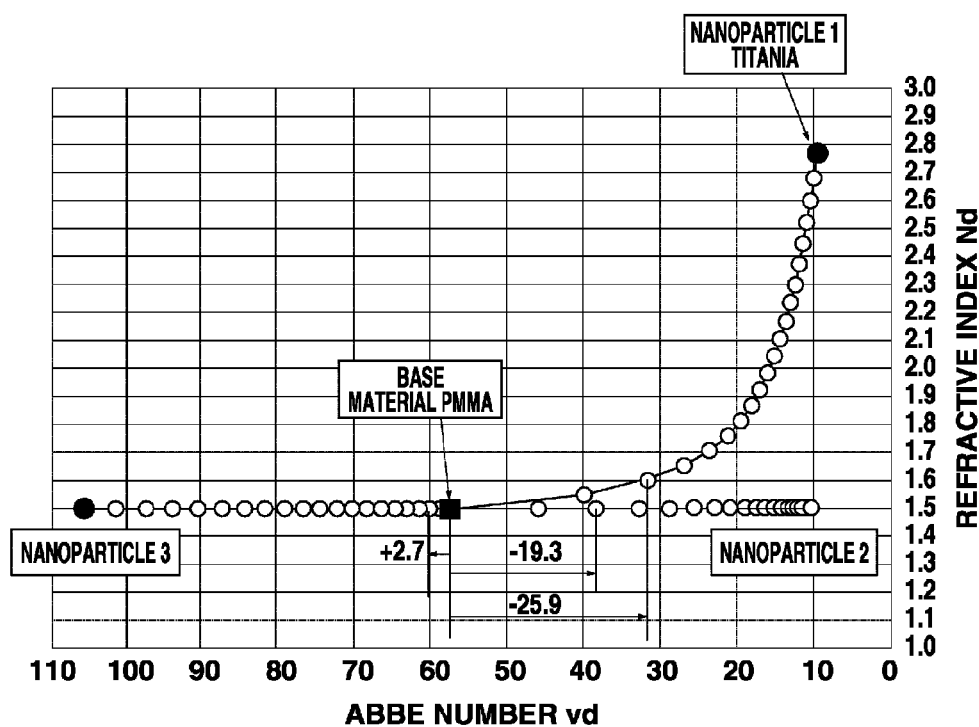
FIG. 20 illustrates a Maxwell-Garnett curve of a nanocomposite material.

A relationship between the refractive index and the Abbe number of each of the nanocomposite materials obtained by mixing the nanoparticles with the base material is illustrated in FIG. 20. In FIG. 20, a filled square indicates optical characteristics (refractive index and Abbe number) of PMMA used as the base material. A filled circle indicates optical characteristics of the nanoparticles, and an unfilled circle indicates optical characteristics when a volume ratio of the nanoparticles is increased by every 5% as in 5%, 10%, 15%, and 20%.

An amount of change from the Abbe number of the base material to Abbe number of the nanocomposite material in which the nanoparticles having a volume ratio of 10% was added to the base material is considered as Abbe number variation Dvd(h), and the Abbe number variations were compared. As a result of the comparison: Nanoparticles 1 attained Dvd(h) of −25.9; Nanoparticles 2 attained Dvd(h) of −19.3; and Nanoparticles 3 attained Dvd(h) of +2.7.

The difference in Abbe number between Nanoparticles 2 and the base material and the difference in Abbe number between Nanoparticles 3 and the base material are equal in amount and reverse in sign. In short, Nanoparticles 2 and Nanoparticles 3 are in equidistance relationship to the base material (the differences in Abbe number from the base material are the same).

However, the Abbe number variation Dvd(h) of Nanoparticles 2, which is −19.3, is predominantly larger than that (+2.7) of Nanoparticles 3. In other words, it is revealed that it is possible to effectively change the Abbe number by using the nanoparticles having the lower Abbe number than the base material.

Also, Nanoparticles 1 and Nanoparticles 2 have the same Abbe number, which is smaller than that of the base material, and the refractive index of Nanoparticles 1 is higher than that of Nanoparticles 2. In the comparison between Nanoparticles 1 and Nanoparticles 2, Abbe number variations Dvd(h) are the same when the volume ratio is 100% since Nanoparticles 1 and Nanoparticles 2 have the identical Abbe number. However, in a region where the volume ratio of the nanoparticles is small (h is less than or equal to 0.5), Nanoparticles 1 has a larger absolute value of the Abbe number variation Dvd(h). In comparison between nanocomposite materials each having the volume ratio of 10%, Dvd(h) of Nanoparticles 1 is −25.9, while Dvd(h) of Nanoparticles 2 is −19.3 to show that Nanoparticles 1 has the larger absolute value of the Abbe number variation Dvd(h).

In short, if the nanoparticles have the smaller Abbe number than the base material and the identical Abbe numbers, the nanoparticles having the higher refractive index are capable of increasing the Abbe number variation in the region where the volume ratio of the nanoparticles is smaller.

Since the lower volume ratio of the nanoparticles contributes to easy production, it is favorable to effectively increase the Abbe number variation by using nanoparticles having a high refractive index. The refractive index of the nanoparticles may preferably be higher than that of the base material and may be 1.8 or more, more preferably, 2.0 or more.

Optical designing will hereinafter be described.

In the case of forming the refractive index distribution in a radial direction in the optical element using the nanocomposite material, the refractive index distribution is given by a power series expansion formula expressed in Equation (5). It is not particularly necessary to limit an order of the power series expansion formula in the present exemplary embodiments, and the order is eighth or less for simplicity.

$$N(r,L) = N_{00,L} + N_{10,L}r^2 + N_{20,L}r^4 + N_{30,L}r^6 + N_{40,L}r^8 + \quad (5)$$

In Equation (5), $N_{00,L}$ represents a refractive index on the optical axis at a wavelength L, each of $N_{10,L}$, $N_{20,L}$, $N_{30,L}$, and $N_{40,L}$ represents a coefficient of power series expansion, and r represents a distance from the optical axis in the radial direction.

It is possible to vary the refractive index $N_{00,L}$, and the coefficients $N_{10,L}$, $N_{20,L}$, $N_{30,L}$, and $M_{40,L}$ of power series expansion for each of wavelengths, and refractive index distributions $N_C(r)$, $N_d(r)$, $N_F(r)$, and $N_g(r)$ are assigned to C-line, d-line, F-line, and g-line, respectively.

$$N_C(r) = N_{00,C} + N_{10,C}r^2 + N_{20,C}r^4 + N_{30,C}r^6 + N_{40,C}r^8$$

$$N_d(r) = N_{00,d} + N_{10,d}r^2 + N_{20,d}r^4 + N_{30,d}r^6 + N_{40,d}r^8$$

$$N_F(r) = N_{00,F} + N_{10,F}r^2 + N_{20,F}r^4 + N_{30,F}r^6 + N_{40,F}r^8$$

$$N_g(r) = N_{00,g} + N_{10,g}r^2 + N_{20,g}r^4 + N_{30,g}r^6 + N_{40,g}r^8$$

Conditions for chromatic aberration correction by the refractive index distribution optical element are required to satisfy Equation (6) in a thin system.

$$faS/vd + faN/v10 = 0 \quad (6)$$

In Equation (6), faS represents a refractive power by a surface shape of the optical element; vd represents Abbe number on the optical axis; faN is a power by the refractive index distribution and expressed by Equation (7); and v10 is Abbe number expressed by Equation (8).

$$faS = -2N_{10,d}d \quad (7)$$

In Equation (7), d represents a thickness of the optical element.

$$v10 = N_{10,d}/(N_{10,F} - N_{10,C}) \quad (8)$$

Accordingly, Equation (9) is obtained by substituting Equations (7) and (8) into Equation (6).

$$faS/vd - 2d(N_{10,F} - N_{10,C}) = 0 \quad (9)$$

Further, Equation (10) is obtained by transforming Equation (9).

$$N_{10,F} - N_{10,C} = faS/2dvd \quad (10)$$

As described above, whether the value of the refractive power faS by the surface shape of the optical element is positive or negative, the conditions for the chromatic aberration correction by the refractive index distribution optical element are determined by the value of $N_{10,F} - N_{10,C}$ irrespective of the power faN by the refractive index distribution. In short, the conditions are determined by the Abbe number distribution, not by the refractive index distribution.

However, when the signs of the refractive power faS by the surface shape of the optical element and the power faN by the refractive index distribution are identical to each other, the power by the surface shape and the power by the refractive index distribution can share the power of the optical element. Accordingly, since it is possible to reduce the curvature of the surface shape of the optical element, there is an advantage in terms of the optical designing of reducing aberrations (spherical aberration and coma aberration, astigmatism, curvature of field, distortion) to be generated.

Hereinafter, a relationship between the conditions for chromatic aberration correction and the refractive index Abbe number distribution shape will be described. When the refractive power faS by the surface shape of the optical element is positive, $N_{10,F} - N_{10,C}$ that satisfies Equation (10) is positive. When the power faN by the refractive index distribution is also positive, $N_{10,C}$, $N_{10,d}$, and $N_{10,C}$ are negative, and $N_{10,C}$ is smaller than $N_{10,F}$. In terms of absolute values, a relationship "$|N_{10,C}|$ is larger than $|N_{10,F}|$" is established.

The refractive indexes with respect to C-line, d-line, and F-line on the optical axis of the optical element are represented by $N_C(ct)$, $N_d(ct)$, and $N_F(ct)$, respectively, and refractive indexes at the peripheral portion of the optical element are represented by $N_C(ed)$, $N_d(ed)$, and $N_F(ed)$, respectively. Here, dispersion $N_F(ct) - N_C(ct)$ at the peripheral portion is larger than dispersion $N_F(ct) - N_C(ct)$ on the optical axis.

This means the refractive index Abbe number distribution shape (the diagonally-right-down distribution, i.e. the distribution in the direction A, in FIG. 5 of U.S. Pat. No. 5,366,939) in which both of the refractive index and the Abbe number are reduced along a direction from the optical axis to the periphery.

Likewise, when the refractive power faS by the surface shape of the optical element and the power faN by the refractive index distribution are negative: $N_{10,F} - N_{10,C}$ is negative; $N_{10,C}$, $N_{10,d}$, and $N_{10,F}$ are negative; and $N_{10,C}$ is larger than $N_{10.F}$. In terms of absolute values, a relationship "$|N_{10.C}|$ is larger than $|N_{10.F}|$" is established.

Dispersion $N_F(ct)-N_C(ct)$ on the optical axis is smaller than dispersion $N_F(ct)-N_c(ct)$ at the peripheral portion.

This means the refractive index Abbe number distribution shape (the diagonally-left-up distribution, i.e. the distribution in the direction A, in FIG. 5 of U.S. Pat. No. 5,366,939) in which both of the refractive index and the Abbe number are increased along a direction from the optical axis to the periphery.

As described above, the conditions for chromatic aberration correction and the refractive index Abbe number distribution are related to each other, and it is possible to satisfy achromatic conditions as well as to realize the chromatic aberration correction even when the refractive power faS by the surface shape of the optical element and the power faN by the refractive index distribution have the same sign.

However, there is a problem in forming the diagonally-right-down distribution or the diagonally-left-up distribution in the refractive index Abbe number distribution shape.

The diagonally-right-down distribution and the diagonally-left-up distribution are formed by mixing a base material having low refractive index and Abbe number with nanoparticles having higher refractive index and Abbe number than those of the base material and imparting a gradient of the nanoparticles along a direction from the optical axis to the peripheral portion of the optical element.

In the case of using the nanoparticles having the Abbe number higher than that of the base material, an Abbe number variation Dvd to an increase in volume ratio of the nanoparticles is small at a portion where a volume ratio of the nanoparticles is low. Therefore, it is necessary to considerably increase the volume ratio of the nanoparticles for obtaining a desired Abbe number variation Dvd. However, it is difficult to obtain the desired Abbe number variation (Abbe number difference) even by mixing the minute particles in an amount of 50%, which is the upper limit with the base material.

Since a problem of strength of the nanocomposite material is caused when the volume ratio of the nanoparticles is increased, it is desirable to keep the volume ratio of the minute particles to 30% or less (preferably 20% or less).

To solve the above problems, the present invention uses nanoparticles having Abbe number that is lower than the base material as the nanocomposite material. With such configuration, the above-described refractive index Abbe number distribution shape (the distribution in the direction A including the diagonally-right-up distribution and the diagonally-left-down distribution in FIG. 5 of U.S. Pat. No. 5,366,939) are attained. The optical element having such distribution is formed by a density gradient of the nanoparticles along a direction from the optical axis to the peripheral portion of the optical element by mixing the nanoparticles having the higher refractive index than the base material and the lower Abbe number than the base material with the base material.

Accordingly, each of the present exemplary embodiments is directed to the optical element using the nanocomposite material in which the density gradient of the nanoparticles is formed in the radial direction by mixing the nanoparticles having the lower Abbe number than the base material with the base material. The density of the nanoparticles is higher at the peripheral portion than that on the optical axis when the power of an optical element group including the optical element is positive, while the density of the nanoparticles is lower at the peripheral portion than that on the optical axis when the power of an optical element group including the optical element is negative.

In the case of using the nanoparticles having the lower Abbe number than the base material, it is possible to increase the Abbe number variation Dvd to the increase in volume ratio of the nanoparticles at the portion where the volume ratio of the nanoparticles is low. Therefore, it is possible to obtain a desired Abbe number variation Dvd with the low density nanoparticles.

As described above, with the use of the nanoparticles (metal oxide, ion, or the like) having the lower Abbe number than the base material, it is possible to effectively form the Abbe number change when mixing the nanoparticles with an optical resin or an optical glass serving as the base material.

By disposing the optical element within the optical element group as described above, it is possible to correct chromatic aberration generated by the positive power by reducing the density of the nanoparticles along a direction from the optical axis to the peripheral portion to make. Also, it is possible to correct chromatic aberration generated by a negative power by increasing the density of the nanoparticles along the direction from the optical axis to the peripheral portion. Thus, the chromatic aberration correction in the optical lens group is enabled to make it possible to provide a high performance zoom lens in which the chromatic aberration is corrected well at any zoom position involving movement of the optical element group.

Upper and lower positions at which an off-axis light beam passes are replaced with each other at an aperture stop. In other words, correction relationships of chromatic aberration of magnification (lateral chromatic aberration) are replaced with each other at the aperture stop. Though axial chromatic aberration (longitudinal chromatic aberration) is corrected by cancellation by the positive lens and the negative lens, it is impossible to correct chromatic aberration of magnification by disposing the positive lens and the negative lens with the aperture stop being placed therebetween.

For example, chromatic aberration of magnification generated by a negative lens located closer to an object side than the aperture stop is generated in the same direction as that of chromatic aberration of magnification generated by a positive lens located closer to an image side than the aperture stop (C-line is outside F-line in both cases). In this case, large chromatic aberration of magnification is generated.

Therefore, in the present exemplary embodiments, the density of the nanoparticles is higher at the peripheral portion that on the optical axis in the case of locating the optical element closer to the image side than the aperture stop of the optical system. In the case of locating the optical element closer to the object side than the aperture stop, the density of the nanoparticles is lower at the peripheral portion than on the optical axis.

It is possible to correct chromatic aberration of magnification generated by the negative power of the optical element located closer to the object side than the aperture stop by increasing the density of the nanoparticles along a direction from the optical axis to the peripheral portion. Also, it is possible to correct chromatic aberration of magnification generated by the positive power of the optical element located closer to the image side than the aperture stop by reducing the density of the nanoparticles along a direction from the optical axis to the peripheral portion. Since the positions at which the off-axis light beam passes in the optical element are changed at every field angle, it is possible to correct chromatic aberration of magnification according to each of the field angles. Further, since the positions at which the off-axis light beam passes in the optical element are changed at every zoom position in a zoom lens optical system in which the focal length is changed by moving the optical element groups, it is possible to correct chromatic aberration of magnification according to each of the zoom positions. Particularly, since the position at which an off-axis light beam passes in the optical element is prominently changed when the optical element using the nanocomposite material is located in the optical element group positioned closest to the object side in the optical system, it is possible to more easily correct chromatic aberration of magnification. Also, since an imaging magnification of the rear group is high, sensitivity is enhanced to make it possible to perform good chromatic aberration correction with small Abbe number variation.

However, the diagonally-right-up distribution and the diagonally-left-down distribution cause a disadvantage of reversing the power by the refractive index distribution and the direction for correcting chromatic aberration.

In view of chromatic aberration of a single lens, a direction of a refractive power by a surface shape of the lens and a direction of a power by a refractive index distribution become reverse to each other, thereby raising necessity for increasing the curvature of the lens surface for the purpose of equalizing the composite powers. This deteriorates aberrations other than chromatic aberration.

Therefore, in the case of the diagonally-right-up distribution and the diagonally-left-down distribution, a smallest possible refractive index distribution is preferred. It is preferable to use nanoparticles having the same refractive index as the base material and lower Abbe number than the base material. In this case, the refractive index Abbe number distribution is in the form of a lateral linear line.

Hereinafter, a case of performing chromatic aberration correction by using an Abbe number distribution type optical element in an optical element group formed of a plurality of optical elements will be described.

When a power of the optical element group is positive, Abbe number at a peripheral portion is made smaller than that on an optical axis by gradually increasing the density (volume ratio) of nanoparticles having lower Abbe number than a base material along a direction from the optical axis to the peripheral portion of the Abbe number distribution type optical element. Thus, chromatic aberration generated in a positive direction is corrected (reduced).

When the power of the optical element is negative, the Abbe number at the peripheral portion is made higher than that on the optical axis by gradually reducing the density (volume ratio) of the nanoparticles having the lower Abbe number than the base material along the direction from the optical axis to the peripheral portion of the Abbe number distribution type optical element. Thus, chromatic aberration generated in a negative direction is corrected (reduced).

As described above, axial chromatic aberration and chromatic aberration of magnification are corrected well.

Here, the optical element using the nanocomposite material in which the density gradient of the nanoparticles is formed in the radial direction is used as the optical element other than the optical element having the strongest power in the optical element group including the optical element using the nanocomposite material. As described above, in the case of disposing the Abbe number distribution type optical element in the optical element group, it is desirable to use the optical element as the optical element other than that having the strongest power in the optical element group, not as that having the strongest power. Preferably, the optical element is used for that having the lowest power in the optical element group.

Such configuration is preferred since it is preferable to increase the Abbe number of the base material simultaneously with reducing the Abbe number of the nanoparticles to increase the Abbe number variation in the Abbe number distribution type optical element, and the refractive index of the base material tends to be reduced by the configuration. Therefore, when the Abbe number distribution type optical element is used as the optical element having the strongest power in the optical element group, the curvature is increased for attaining a similar power at the low refractive index, thereby deteriorating aberrations.

Accordingly, it is preferable to perform the chromatic aberration correction by using a glass material having a high refractive index for the optical element having the strongest power in the optical element group and using the Abbe number distribution type optical element as the optical element other than the optical element having the strongest power.

In this case, it is possible to select a glass material having low Abbe number for the optical element having the strongest power in the optical element group since the chromatic aberration correction capability is improved by the Abbe number distribution type optical element. Thus, it is possible to use a glass material having a higher refractive index than that of the conventional example as well as to improve aberrations by reducing the curvature, thereby improving performance of the zoom lens optical system.

In the conventional optical system, chromatic aberration is cancelled by a combination of a positive power optical element and a negative power optical element. However, it has been necessary to maintain an excessively strong power for a power that is cancelled by a reverse power for maintaining a power of the optical element group to a constant value.

In the present exemplary embodiments, since the chromatic aberration correction is enabled by the Abbe number distribution type optical element, the reverse power that has been required for chromatic aberration correction is no longer necessary, thereby eliminating the need for the excessive power. Thus, since it is possible to reduce the power of each of the optical elements in the optical element group, it is possible to realize a high performance optical system with a reduced curvature.

Also, an optical system having a power reverse to a power of the optical element group is in some cases located for the purpose of correcting other aberrations.

In the present exemplary embodiments, the optical element using the nanocomposite material in which the density gradient of the nanoparticles is in the radial direction is used as an optical element having a power reverse to that of an optical element group in the optical element group including the optical element using the nanocomposite material.

With such configuration, since it is possible to reduce a power of a curved surface by sharing the power of the curved surface by a power of a refractive index distribution, it is possible to realize a high performance optical system with a reduced curvature.

Also, the density gradient of the nanoparticles in the radial direction is formed by mixing nanoparticles having higher refractive index than a refractive index of a base material with the base material. Among nanoparticles having identical Abbe number, the nanoparticles having the higher refractive index are capable of increasing Abbe number variation Dvd to an increase in volume ratio of the nanoparticles at a portion where the volume ratio of the nanoparticles is low. Therefore, it is possible to obtain a larger Abbe number variation Dvd, which is advantageous for the chromatic aberration correction. Also, since it is possible to increase the Abbe number variation Dvd, it is possible to adopt the optical element to a lens having a relatively large effective diameter such as 8 mm and 10 mm.

The present invention is characterized in that a difference between Abbe numbers of the nanoparticles and the base material is 20 or more. Therefore, it is possible to increase the Abbe number variation Dvd.

It is desirable that "Dvd/DNd is less than or equal to −100" is satisfied when a difference between a refractive index on the optical axis of the optical element and a refractive index at the peripheral portion is represented by DNd and a difference between Abbe number on the optical axis and Abbe number at the peripheral portion is represented by Dvd. With such Dvd/DNd, it is possible to increase the Abbe number variation Dvd without being influenced too much from the refractive index distribution, and, therefore, it is possible to perform the chromatic aberration correction without deteriorating other aberrations when the optical element is located in the optical system.

When the nanoparticles of which Abbe number is smaller than the base material by 30 or more are used, it is possible to increase the Abbe number variation Dvd to the refractive index variation DNd as well as to satisfy "|Dvd/DNd| is greater than or equal to 100" when a volume ratio of the nanoparticles is 30%. Further, it is preferable to satisfy "|Dvd/DNd| is greater than or equal to 150" by using nanoparticles of which Abbe number is smaller than the base material by 40 or more when a volume ratio of the nanoparticles is 30%.

Figure 1A:
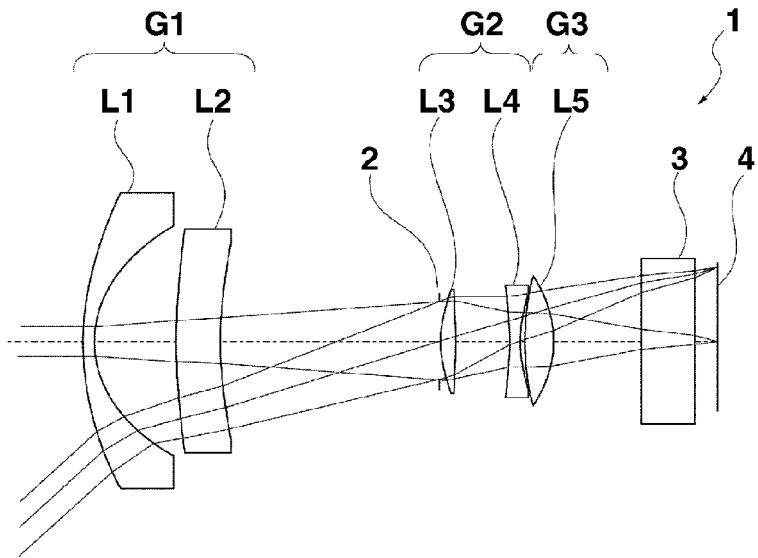
FIG. 1A is a sectional view illustrating an image pickup apparatus according to a first exemplary embodiment of the present invention.
Figure 1B:
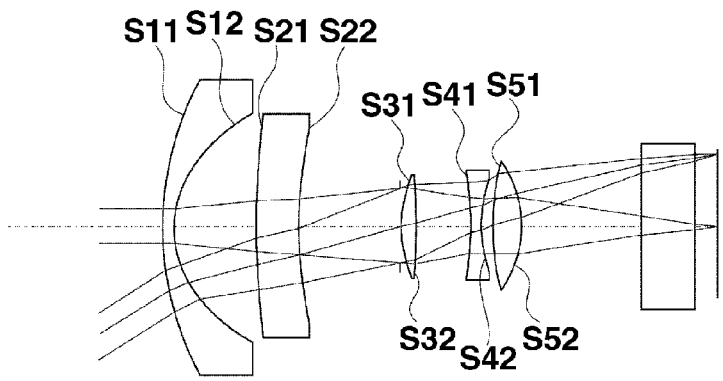
FIG. 1B is a sectional view illustrating the image pickup apparatus according to the first exemplary embodiment of the present invention.
Figure 1C:
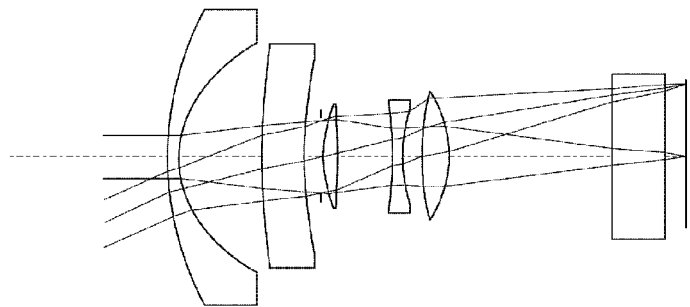
FIG. 1C is a sectional view illustrating the image pickup apparatus according to the first exemplary embodiment of the present invention.

FIGS. 1A to 1C are sectional views taken along an optical axis direction illustrating an image pickup apparatus, according to a first exemplary embodiment of the present invention, when the image pickup apparatus is set at a wide-angle end, a middle focal length, and a telephoto end, respectively.

Referring to FIGS. 1A to 1C, a zoom lens 1 includes a first lens group G1 including a first lens L1 and a second lens L2 and an aperture stop 2 in the order from an object side. The zoom lens 1 further includes a second lens group G2 including a third lens L3 and a fourth lens L4 and a third lens group G3 including a fifth lens L5, which are located closer to an image side than the aperture stop 2. The image pickup apparatus includes the zoom lens 1, an optical filter 3 located at the object side of the zoom lens 1 and formed of an infrared ray cutting filter and a low pass filter, and a solid-state image sensor 4, which is a complementary metal oxide semiconductor (CMOS) sensor, a charge coupled device (CCD), or the like. An optical image formed on an image pickup plane after passing through the zoom lens 1 and the optical filter 3 is subjected to photoelectric conversion by the solid-state image sensor 4 and then converted into an image signal by predetermined processing.

The zoom lens according to the first exemplary embodiment of the present invention is a 3-group-5-element zoom lens of negative-positive-positive type.

The configuration of the zoom lens according to the first exemplary embodiment is illustrated in Table 1.

The first lens L1 is a negative meniscus lens of which a concave surface is oriented to the image side, in which an entrance surface S11 is formed of a spherical surface, and an exit surface S12 is formed of an aspherical surface. The second lens L2 is a meniscus lens of which a concave surface is oriented to the image side, in which each of an entrance surface S21 and an exit surface S22 is formed of a spherical surface. The first lens L1 and the second lens 12 form the first lens group (first optical element group) G1, and the first lens group G1 has a negative power.

The third lens L3 is a bi-convex lens, in which an entrance surface S31 is formed of an aspherical surface, and an exit surface S32 is formed of a spherical surface. The fourth lens L4 is a bi-concave lens, in which each of an entrance surface S41 and an exit surface S42 is formed of a spherical surface. The third lens L3 and the fourth lens L4 form the second lens group G2, and the second lens group G2 has a positive power.

The fifth lens L5 is a bi-convex lens, in which each of an entrance surface S51 and an exit surface S52 is formed of a spherical surface. The fifth lens alone forms the third lens group G3, and the third lens group G3 has a positive power.

With such configuration, the zoom lens having a wide field angle represented by 2w=83.44 deg (corresponding to focal length of 24 mm in terms of a 35 mm film) and a zoom ratio of ×2 is formed.

The second lens L2 is a lens (optical element) using a nanocomposite material obtained by mixing a base material with nanoparticles having lower Abbe number than the base material and forming a density gradient of the nanoparticles in a radial direction of the lens. The first lens group G1 including the second lens L2 has the negative power, and the density of the nanoparticles of the second lens L2 is lower at a peripheral portion than on an optical axis.

Figure 2:
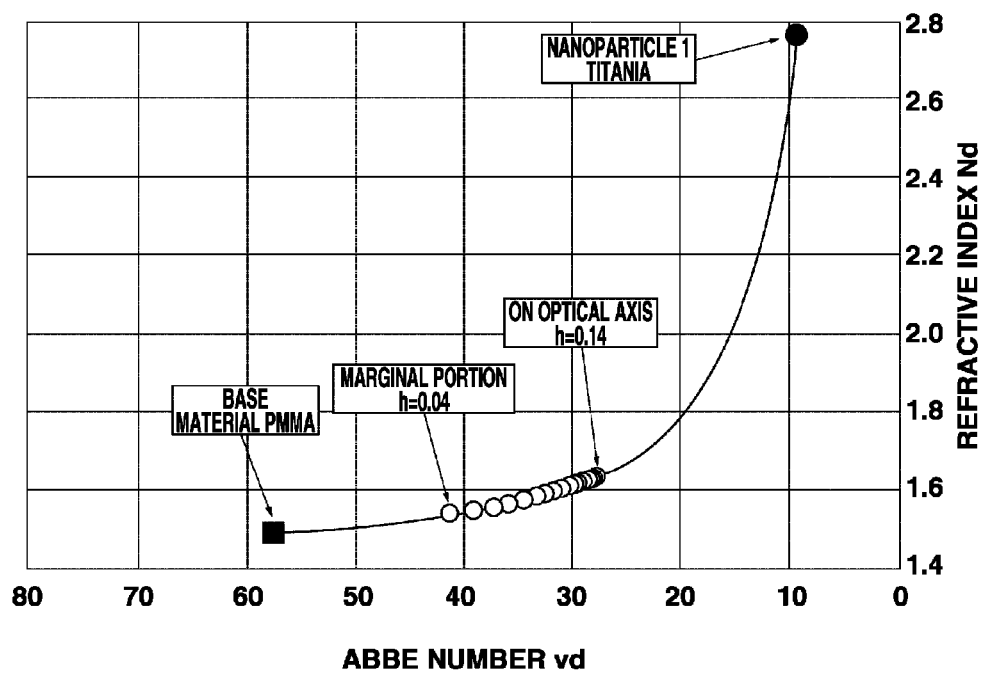
FIG. 2 illustrates a refractive index Abbe number distribution of a second lens according to the first exemplary embodiment of the present invention.

Illustrated in FIG. 2 is a refractive index Abbe number distribution of the second lens L2.

More specifically, in the second lens L2, PMMA (Nd=1.492, vd=57.2), which is an optical resin, is used as the base material, and titania TiO2 (Nd=2.761, vd=9.5) is used as the nanoparticles. In short, the lens is obtained by using the nanocomposite material obtained by mixing the base material with the nanoparticles having the lower Abbe number than the base material as described above.

About 14% (h=0.14) of the nanoparticles of titania is mixed with PMMA serving as the base material at the portion on the optical axis, and the density of the titania nanoparticles is gradually reduced as a distance from the optical axis increases. The density of the titania nanoparticles is reduced to about 4% (h=0.04) at the peripheral portion. Therefore, the density of the nanoparticles is lower at the peripheral-portion than on the optical axis.

Thus, an orthogonally-left-down refractive index Abbe number distribution is formed by forming the density gradient of the nanoparticles in the radial direction of the second lens L2.

Figure 3:
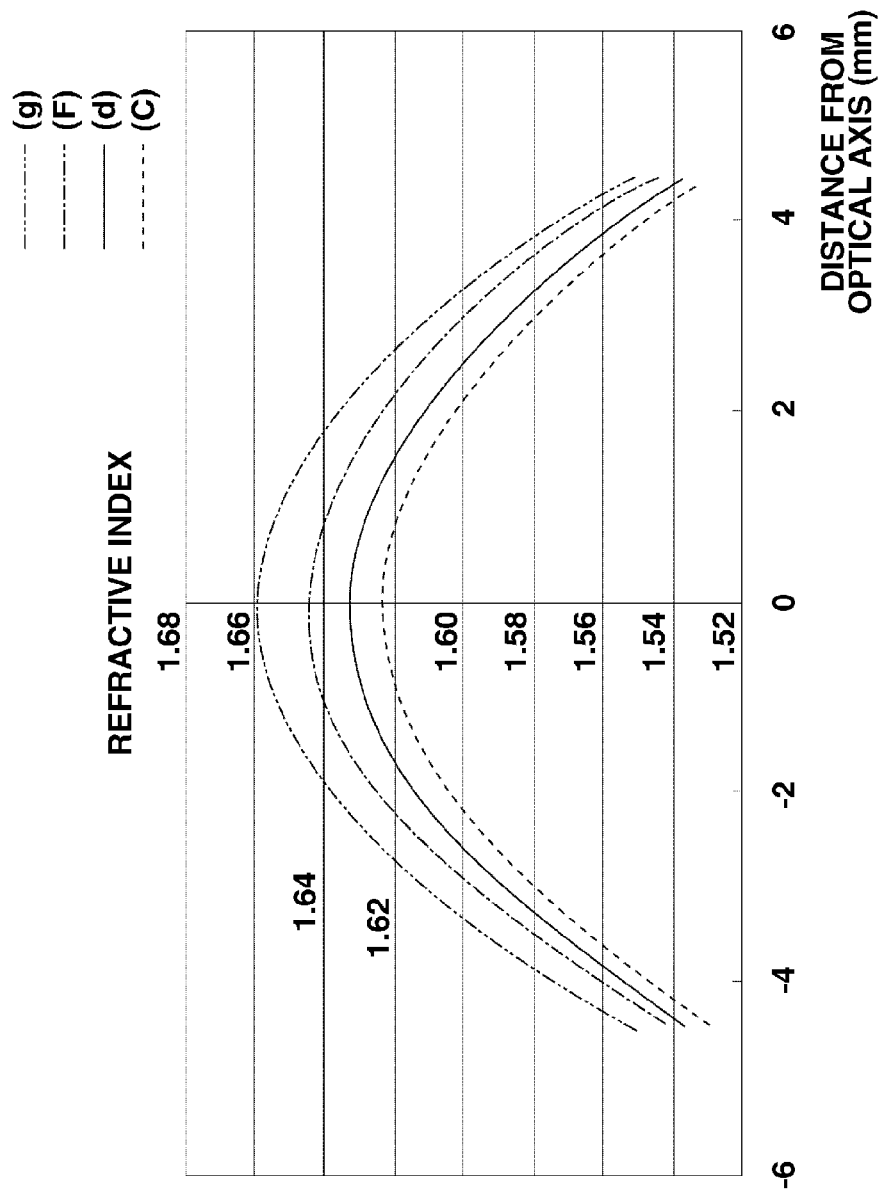
FIG. 3 illustrates a refractive index distribution of the second lens according to the first exemplary embodiment of the present invention.

Illustrated in FIG. 3 is a refractive index distribution of the second lens L2 according to the first exemplary embodiment.

FIG. 3 illustrates refractive index distributions with respect to typical spectral lines, which are C-line (broken line), d-line (solid line), F-line (dashed-dotted line), and g-line (dashed-two-dotted line).

In each of the refractive index distributions of the spectral lines, a portion on the optical axis is the highest, and the refractive index is reduced as the distance from the optical axis increases. As illustrated in Table 1, among the power series expansion formulas illustrated in Formula (5) as expressions for the refractive index distribution, only the terms of the zeroth order and second order are used. Therefore, the distribution is expressed by a quadratic function to the distance r from the optical axis.

Meanwhile, in the refractive index distribution, a refractive index difference among the spectral lines is reduced as the distance from the optical axis increases. As illustrated in Table 1, an absolute value of a second order coefficient of Formula (5) is increased as approaching to a short wavelength side.

Accordingly, the following relational expression is satisfied:

$$|N_{10.C}| < |N_{10.d}| < |N_{10.F}| < |N_{10.g}|$$

Also, since all of the coefficients $N_{10.C}$, $N_{10.d}$, $N_{10.F}$, and $N_{10.g}$ are negative, the following expression:

$$N_{10.C} > N_{10.d} > N_{10.F} > N_{10.g}$$

is satisfied.

Though only the second order term of the power series expansion formulas illustrated in Formula (5) is used in the present exemplary embodiment, it is possible to exhibit the effect of the present invention by using the fourth order, sixth order, eighth order, or tenth order term without limitation to the second order term.

Figure 4:
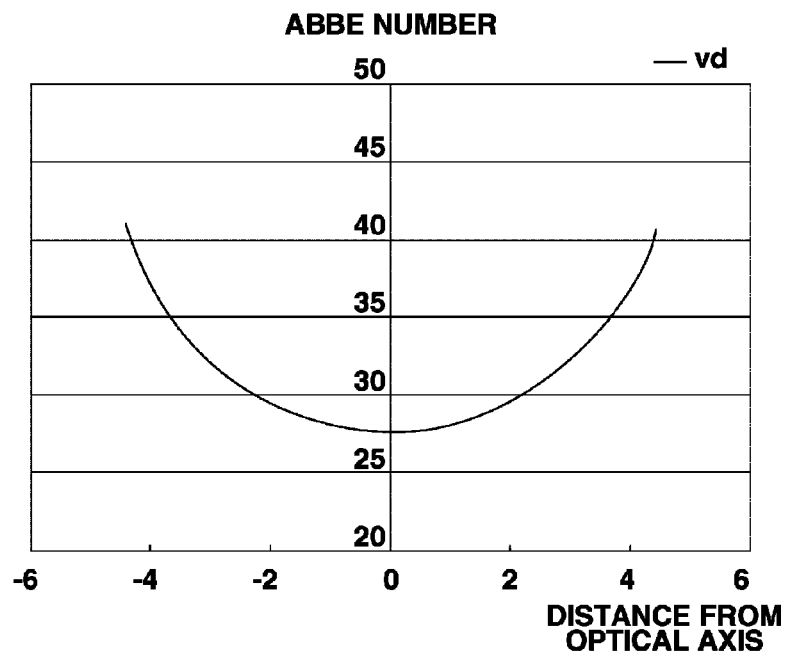
FIG. 4 illustrates an Abbe number distribution of the second lens according to the first exemplary embodiment of the present invention.

FIG. 4 illustrates an Abbe number distribution of the second lens L2 according to the first exemplary embodiment.

The distribution illustrated in FIG. 4 is obtained by representing the refractive index distribution of FIG. 3 by way of Abbe number distribution. In the distribution, the Abbe number is gradually increased as the distance from the optical axis increases. Thus, it is possible to well correct chromatic aberration generated by the negative power.

Chromatic aberration generated by the positive power means a state in which C-line forms an image at the rear (reverse to the object side; closer to the image side) of a focal position of d-line, and F-line forms an image at the front (closer to the object side) in the case of axial chromatic aberration. The chromatic aberration generated by the negative power means a state in which C-line forms an image in front of the focal position of d-line, and F-line forms an image at the rear in the case of axial chromatic aberration.

In this case, the refractive index variation DNd with respect to d-line is −0.095, and the Abbe number variation Dvd with respect to d-line is 13.4.

Figure 5A:
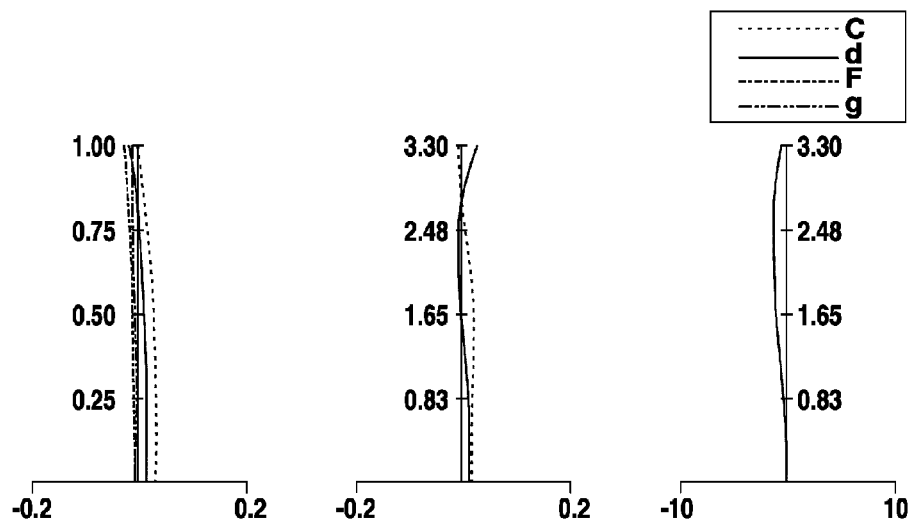
FIG. 5A illustrates longitudinal aberration of a zoom lens according to the first exemplary embodiment of the present invention.
Figure 5B:
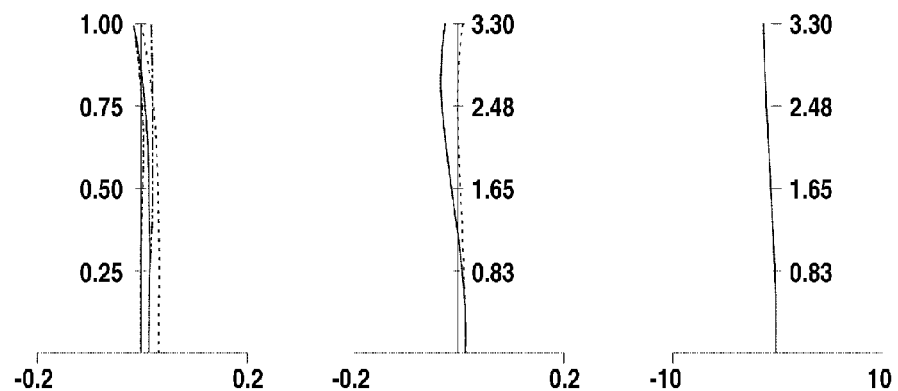
FIG. 5B illustrates longitudinal aberration of a zoom lens according to the first exemplary embodiment of the present invention.
Figure 5C:
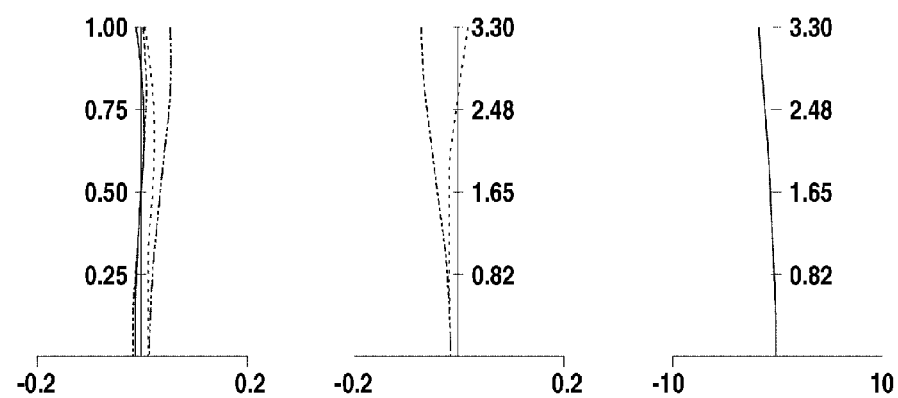
FIG. 5C illustrates longitudinal aberration of a zoom lens according to the first exemplary embodiment of the present invention.

Illustrated in FIGS. 5A, 5B, and 5C are a diagram of aberrations at a wide-angle end, a diagram of aberration at a middle focal length, and a diagram of aberration at a telephoto end, respectively. In each of the aberration diagrams of FIGS. 5A to 5C, spherical aberration, astigmatism, and distortion are illustrated in this order from left to right (the same applies to the following aberration diagrams).

At each of zoom positions of the wide-angle end, middle focal length, and telephoto end, axial aberration, spherical aberration, astigmatism, curvature of field, and distortion are corrected well to realize a high quality wide-angle zoom lens.

As described above, by forming the Abbe number distribution in which Abbe number is increased from the optical axis to the peripheral portion of the second lens L2, it is possible to well correct the chromatic aberration generated by the negative power of the first lens group G1. The second lens L2 is the lens using the nanocomposite material in which the density gradient of the nanoparticles is formed in the radial direction of the lens by mixing the base material with the nanoparticles having the Abbe number lower than the base material. The second lens L2 achieves the good chromatic correction due to the gradual reduction in density of the nanoparticles along the direction from the optical axis to the peripheral portion. Hereinafter, the lens in which the density gradient is formed in the radial direction of the lens will be referred to as a dispersed distribution type nanocomposite lens.

Figure 6A:
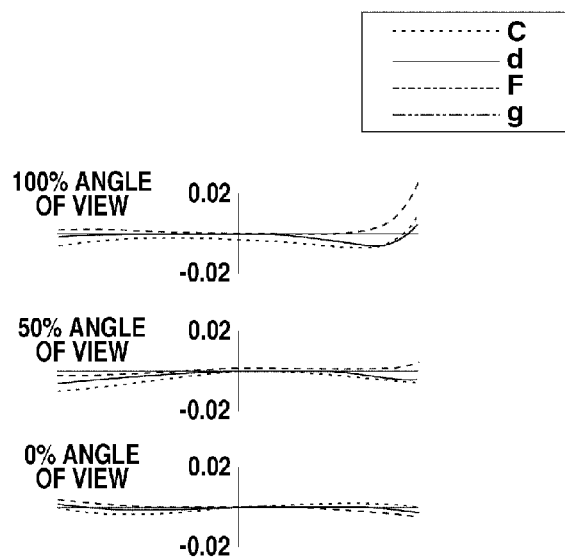
FIG. 6A illustrates lateral aberration of the zoom lens according to the first exemplary embodiment of the present invention.
Figure 6B:
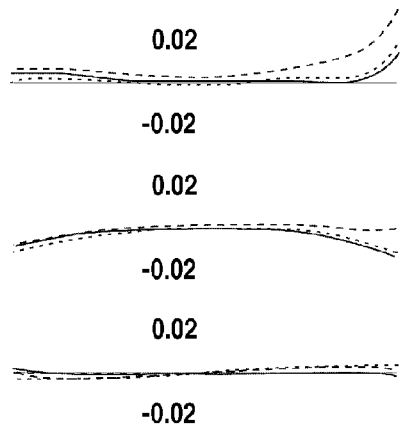
FIG. 6B illustrates lateral aberration of the zoom lens according to the first exemplary embodiment of the present invention.
Figure 6C:
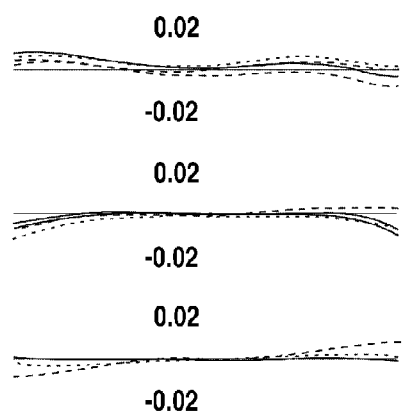
FIG. 6C illustrates lateral aberration of the zoom lens according to the first exemplary embodiment of the present invention.

Illustrated in FIGS. 6A, 6B, and 6C are a diagram of lateral aberration at a wide-angle end, a diagram of lateral aberration at a middle focal length, and a diagram of lateral aberration at a telephoto end, respectively.

At each of zoom positions of the wide-angle end, middle focal length, and telephoto end, chromatic aberration of magnification, coma aberration, and curvature of field are corrected well to realize a high quality wide-angle zoom lens.

As described above, the chromatic aberration of magnification generated in the optical system is corrected well by forming the Abbe number distribution in which Abbe number is increased from the optical axis to the peripheral portion in the second lens L2 included in the first lens group G1, which is located closer to the object side than the aperture stop.

The desired Abbe number distribution is formed since the density of the nanoparticles contained in the dispersed distribution type nanocomposite lens obtained by mixing the base material with the nanoparticles having the lower Abbe number than the base material is gradually reduced along the direction from the optical axis to the peripheral portion in the same manner as described above.

The dispersed distribution type nanocomposite lens is used as the second lens L2, which is one of the lenses except for the first lens L1 having the strongest power in the first lens group G1. Therefore, it is possible to correct the large chromatic aberration generated by the first lens L1 by the second lens L2, which is the dispersed distribution type nanocomposite lens, while maintaining the large optical power of the first lens L1 at the reduced curvature by using the high refractive index glass material for the first lens L1.

Since it is unnecessary to cancel chromatic aberration by using the lenses of negative power and positive power as is the case with conventional optical systems, it is not required to impart an unnecessarily large negative power, and it is possible to use the meniscus lens of which the concave surface is oriented to the image side as the first lens L1. Since the meniscus lens has a concentric shape that enables to reduce an angle at which a light beam having a wide field angle enters the entrance surface S11 and the exit surface S12 of the first lens, it is possible to reduce an amount of aberration such as coma aberration and astigmatism to be generated at the wide field angle.

Further, the second lens L2 is the lens having the weakest power in the first lens group G1. Since the optical resin having low refractive index is used for the base material in the second lens L2, it is preferable that the second lens L2 does not have the optical power of the first lens group G1.

Due to the refractive index distribution in which the refractive index is reduced along the direction from the optical axis to the peripheral portion, a weak positive power is generated. Since the second lens L2 is the meniscus lens of which the concave surface is oriented to the image side, a curvature of the exit surface S22 is larger than that of the entrance surface S21 to generate a negative refractive power by the surface shape. The weakly positive total power of the second lens L2 attained by both of the negative refractive power and the positive power by the refractive index distribution contributes to correction of aberrations such as spherical aberration, coma aberration, astigmatism, curvature of field, and distortion.

As described above, the dispersed distribution type nanocomposite lens enables providing the zoom lens having the wider angle.

In the second lens L2, PMMA (Nd=1.492, vd=57.2), which is an optical resin, is used for the base material, and titania TiO2 (Nd=2.761, vd=9.5) is used for the nanoparticles. A difference between the Abbe number of the base material and the Abbe number of the nanoparticles is maintained to 47.7, which falls within the range of the Abbe number differences of 20 or more, 30 or more, and 40 or more. Therefore, it is possible to greatly change the Abbe number by little Changing the refractive index.

In this case, a difference DNd between the refractive index on the optical axis and the refractive index at the peripheral portion of the second lens L2 is −0.095, and a difference Dvd between the Abbe number on the optical axis and the Abbe number at the peripheral portion is 13.4. Therefore, Dvd/DNd is −141 to satisfy "Dvd/DNd is less than or equal to −100".

Thus, it is possible to form a dispersion distribution type nanocomposite lens suitable for chromatic aberration correction.

Further, since the nanoparticles having the higher refractive index than the refractive index of the base material is used in the second lens L2, it is possible to increase the Abbe number variation as compared to the case of using nanoparticles having similar Abbe number.

Though PMMA, which is an optical resin, is used for the base material in the present exemplary embodiment, PC (polycarbonate), a cycloolefin polymer resin, a UV curable resin, or the like may be used for the base material without limitation to PMMA.

Also, though titania ($TiO_2$) is used for the nanoparticles, zirconia ($ZrO_2$), zinc oxide ($ZnO$), tantalum oxide ($Ta_2O_5$), or the like may be used for the nanoparticles without limitation to titania.

Figure 7A:
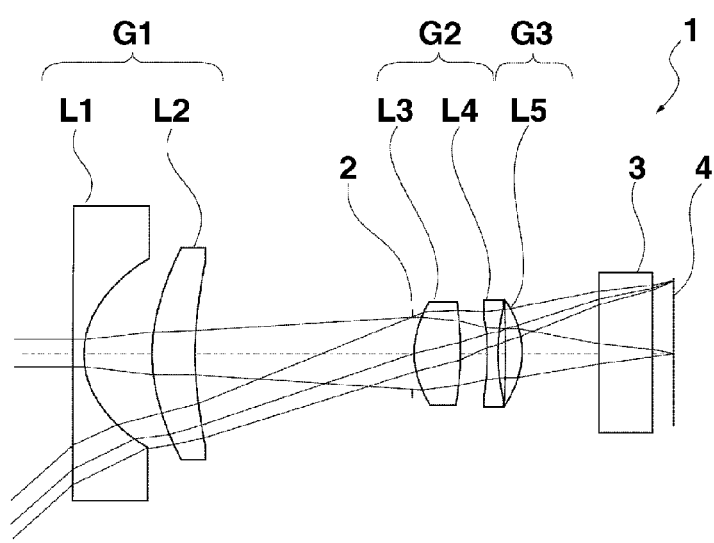
FIG. 7A is a sectional view illustrating an image pickup apparatus according to a second exemplary embodiment of the present invention.
Figure 7B:
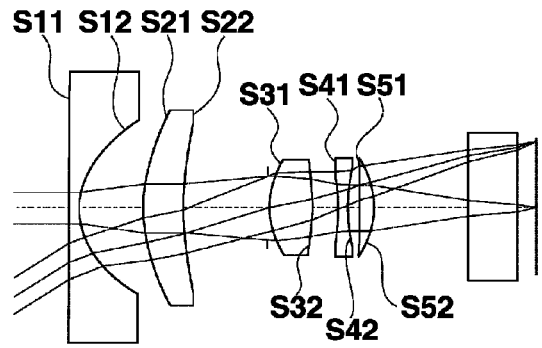
FIG. 7B is a sectional view illustrating the image pickup apparatus according to the second exemplary embodiment of the present invention.
Figure 7C:
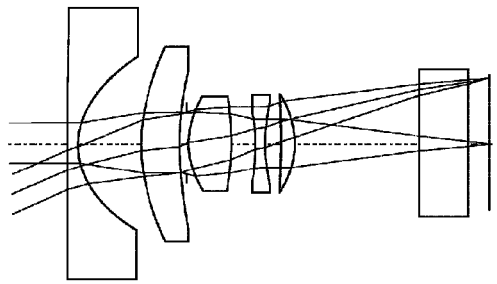
FIG. 7C is a sectional view illustrating the image pickup apparatus according to the second exemplary embodiment of the present invention.

FIGS. 7A to 7C are sectional views taken along an optical axis direction illustrating an image pickup apparatus according to a second exemplary embodiment of the present invention, when the image pickup apparatus is set at a wide-angle end, a middle focal length, and a telephoto end, respectively.

Referring to FIGS. 7A to 7C, a zoom lens 1 includes a first lens group G1 including a first lens L1 and a second lens L2 and an aperture stop 2 in the order from an object side. The zoom lens 1 further includes a second lens group G2 including a third lens L3 and a fourth lens L4 and a third lens group G3 including a fifth lens L5, which are located closer to an image side than the aperture stop 2. The image pickup apparatus includes the zoom lens 1, an optical filter 3 located at the object side of the zoom lens 1 and formed of an infrared ray cutting filter and a low pass filter, and a solid-state image sensor 4, which is a CMOS, a CCD, or the like. An optical image formed on an image pickup plane after passing through the zoom lens 1 and the optical filter 3 is subjected to photoelectric conversion by the solid-state image sensor 4 and then converted into an image signal by predetermined processing.

The zoom lens according to the second exemplary embodiment of the present invention is a 3-group-5-element zoom lens of negative-positive-positive type.

The configuration of the zoom lens according to the second exemplary embodiment is illustrated in Table 2.

The first lens L1 is a bi-concave lens, in which an entrance surface S11 is formed of a spherical surface, and an exit surface S12 is formed of an aspherical surface. The second lens L2 is a positive meniscus lens of which a convex surface is oriented to the object side, in which each of an entrance surface S21 and an exit surface S22 is formed of a spherical surface. The first lens L1 and the second lens 12 form the first lens group (first optical element group) G1, and the first lens group G1 has a negative power.

The third lens L3 is a bi-convex lens, in which an entrance surface S31 is formed of an aspherical surface, and an exit surface S32 is formed of a spherical surface. The fourth lens L4 is a bi-concave lens, in which each of an entrance surface S41 and an exit surface S42 is formed of a spherical surface. The third lens L3 and the fourth lens L4 form the second lens group G2, and the second lens group G2 has a positive power.

The fifth lens L5 is a positive meniscus lens of which a convex surface is oriented to the object side, in which each of an entrance surface S51 and an exit surface S52 is formed of a spherical surface. The fifth lens alone forms the third lens group G3, and the third lens group G3 has a positive power.

Thus, the zoom lens having a wide field angle represented by 2w=83.4 deg (corresponding to a focal length of 24 mm in terms of a 35 mm film) and a zoom ratio of ×2 is formed.

Hereinafter, the first lens L1 will be described.

The first lens L1 is a lens (optical element) using a nanocomposite material obtained by mixing a base material with nanoparticles having lower Abbe number than the base material and forming a density gradient of the nanoparticles in a radial direction of the lens. The first lens group G1 including the first lens L1 has the negative power, and the density of the nanoparticles of the first lens L1 is lower at a peripheral portion than on an optical axis.

Figure 8:
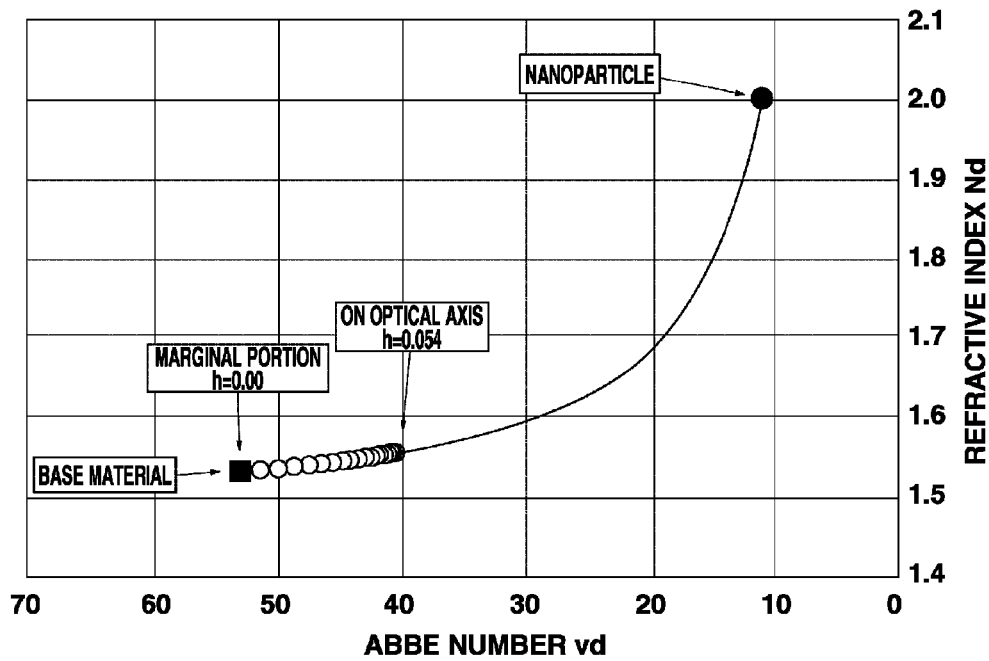
FIG. 8 illustrates a refractive index Abbe number distribution of a second lens according to the second exemplary embodiment of the present invention.

Illustrated in FIG. 8 is a refractive index Abbe number distribution of the first lens L1.

More specifically, for obtaining the first lens L1, the base material (Nd=1.531, vd=53.0) and the nanoparticles (Nd=2.000, vd=11.2) are used. The first lens L1 is obtained by using the nanocomposite material obtained by mixing the base material with the nanoparticles having the lower Abbe number than the base material.

A difference between the Abbe number of the base material and the Abbe number of the nanoparticles is maintained to 41.8, which falls within the range of the Abbe number differences of 20 or more, 30 or more, and 40 or more. Therefore, it is possible to greatly change the Abbe number by little changing the refractive index. Particularly, due to the Abbe number difference of 40 or more, the effect of greatly changing only the Abbe number is great.

About 5.4% (h=0.14) of the nanoparticles is mixed with the base material on the optical axis, and the density of the nanoparticles is gradually reduced as a distance from the optical axis increases so that the peripheral portion is formed only of the base material (nanoparticles=0%). Therefore, the density of the nanoparticles is lowered at the peripheral portion than on the optical axis.

Thus, an orthogonally-left-down refractive index Abbe number distribution is formed by forming the density gradient of the nanoparticles in the radial direction of the first lens L1.

Figure 9:
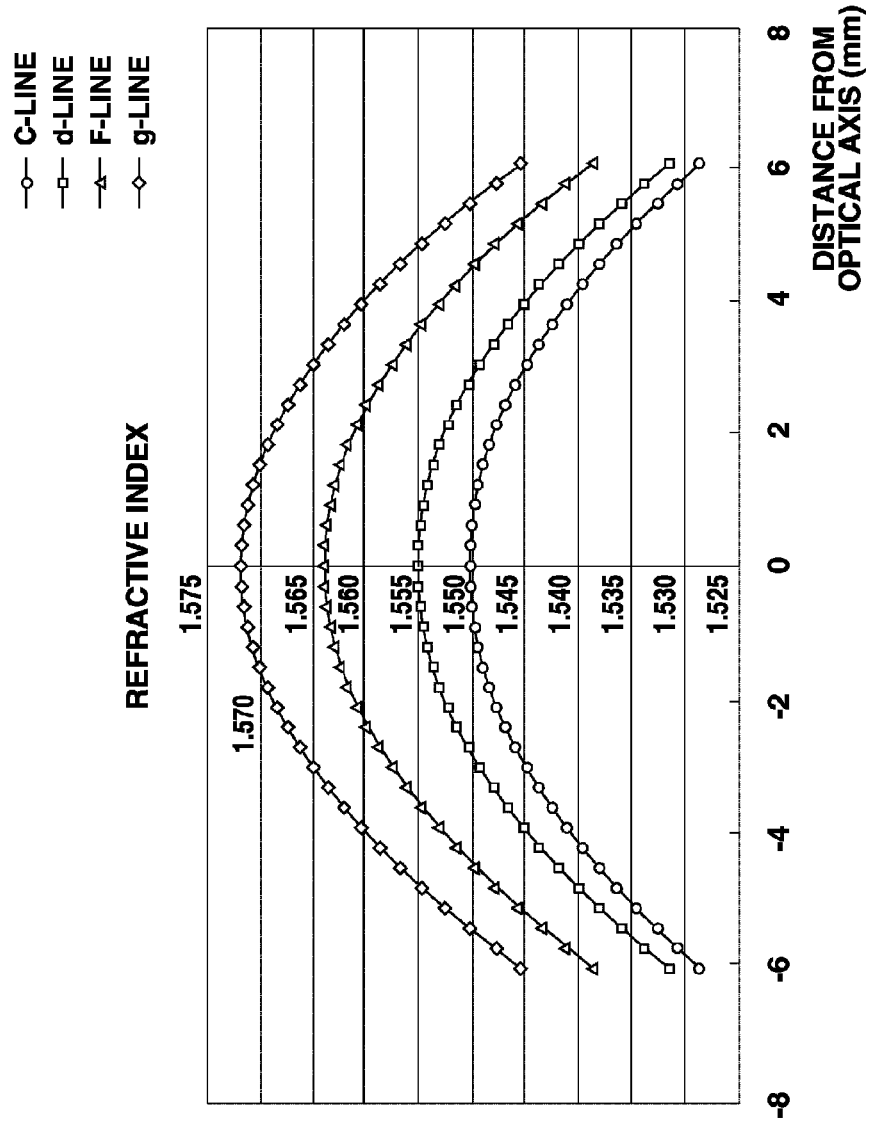
FIG. 9 illustrates a refractive index distribution of the second lens according to the second exemplary embodiment of the present invention.

Illustrated in FIG. 9 is a refractive index distribution of the first lens L1 according to the second exemplary embodiment.

FIG. 9 illustrates refractive index distributions with respect to typical spectral lines, which are C-line, d-line, F-line, and g-line.

In each of the refractive index distributions with respect to the spectral lines, a portion on the optical axis is the highest, and the refractive index is reduced along an increase in distance from the optical axis. As illustrated in Table 2, among the power series expansion formulas illustrated in Formula (5) as expressions for the refractive index distribution, only the terms of the zeroth order and second order are used. Therefore, the distribution is expressed by a quadratic function to the distance r from the optical axis.

Meanwhile, in the refractive index distribution, a refractive index difference among the spectral lines is reduced as the distance from the optical axis increases, and the Abbe number is increased as the distance from the optical axis increases.

Figure 10:
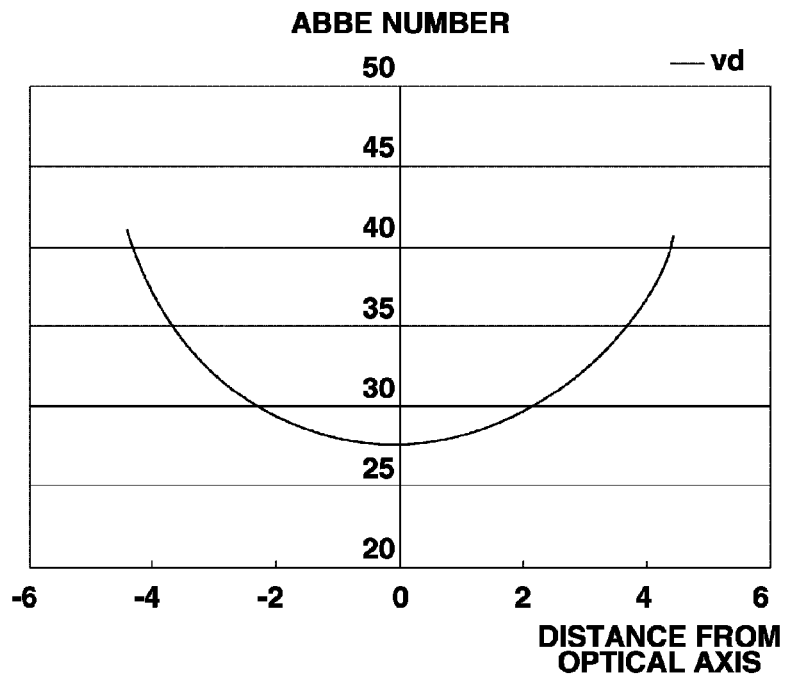
FIG. 10 illustrates an Abbe number distribution Of the second lens according to the second exemplary embodiment of the present invention.

Illustrated in FIG. 10 is an Abbe number distribution of the first lens L1 according to the second exemplary embodiment.

Here, refractive index variation DNd is −0.025, and Abbe number variation Dvd is 12.5. Therefore, Dvd/DNd is −500 to satisfy "Dvd/DNd is less than or equal to −100". Thus, it is possible to form a dispersed distribution type nanocomposite lens suitable for chromatic aberration correction.

Since the nanoparticles used in the first lens L1 has a higher refractive index than that of the base material, it is possible to increase the Abbe number variation as compared to the case of using nanoparticles having similar Abbe number.

Figure 11A:
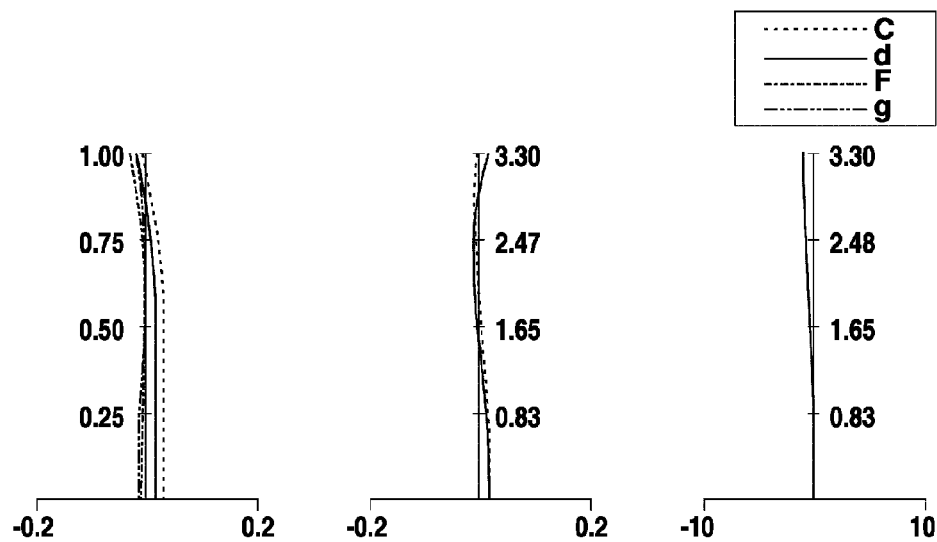
FIG. 11A illustrates longitudinal aberration of a zoom lens according to the second exemplary embodiment of the present invention.
Figure 11B:
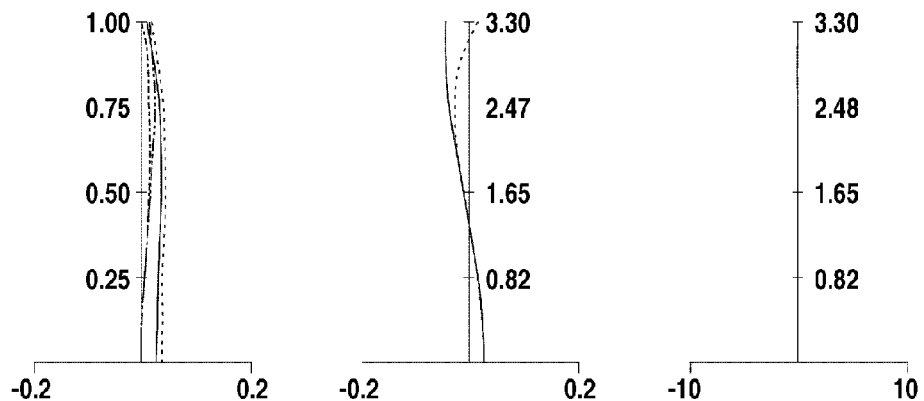
FIG. 11B illustrates longitudinal aberration of the zoom lens according to the second exemplary embodiment of the present invention.
Figure 11C:
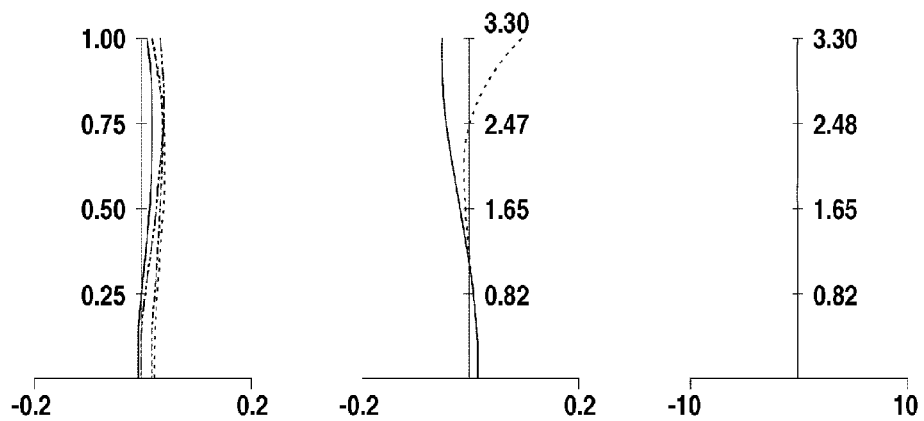
FIG. 11C illustrates longitudinal aberration of the zoom lens according to the second exemplary embodiment of the present invention.

Illustrated in FIGS. 11A, 11B, and 11C are a diagram of aberration at a wide-angle end, a diagram of aberration at a middle focal length, and a diagram of aberration at a telephoto end, respectively. In each of the aberration diagrams of FIGS. 11A to 11C, spherical aberration, astigmatism, and distortion are illustrated in this order from left to right The aberrations at the wide-angle end, middle focal length, and telephoto end are corrected well to realize a high quality wide-angle zoom lens.

As described above, by forming the Abbe number distribution in which Abbe number is increased from the optical axis to the peripheral portion, it is possible to well correct the chromatic aberration generated by the negative power of the first lens group G1.

In short, chromatic aberration is corrected well by using the dispersed distribution type nanocomposite lens in which the density gradient of the nanoparticles is formed in the radial direction of the lens by mixing the base material with the nanoparticles having the Abbe number lower than the base material.

Though the example of using the nanocomposite lens in the optical element group having a negative power is described in the present exemplary embodiment, the nanocomposite lens may be used for an optical element group having a positive power without limitation to that having a negative power. In such case, the same effect is achieved by keeping the density of the nanoparticles higher at the peripheral portion than on the optical axis of the nanocomposite lens.

Figure 12A:
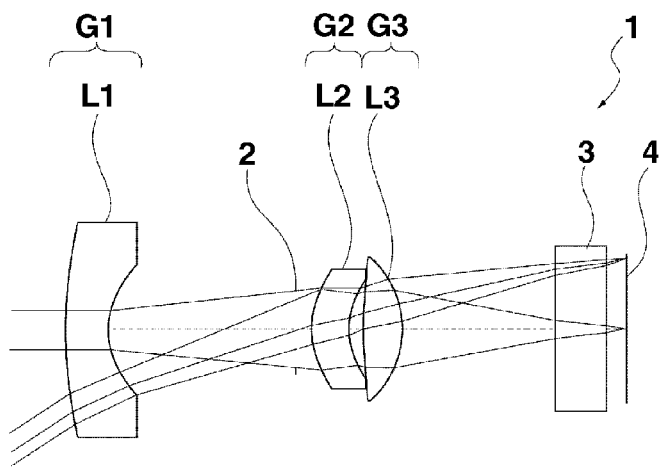
FIG. 12A is a sectional view illustrating an image pickup apparatus according to a third exemplary embodiment of the present invention.
Figure 12B:
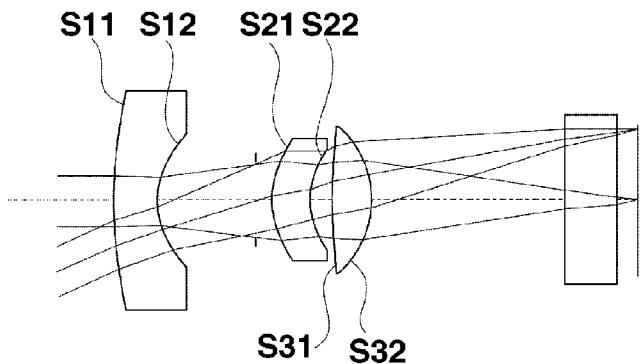
FIG. 12B is a sectional view illustrating the image pickup apparatus according to the third exemplary embodiment of the present invention.
Figure 12C:
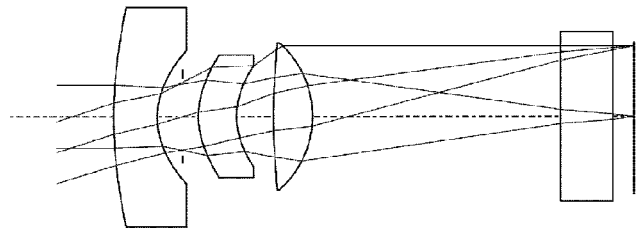
FIG. 12C is a sectional view illustrating the image pickup apparatus according to the third exemplary embodiment of the present invention.

FIGS. 12A to 12C are sectional views taken along an optical axis direction illustrating an image pickup apparatus according to a third exemplary embodiment of the present invention, when the image pickup apparatus is set at a wide-angle end, a middle focal length, and a telephoto end, respectively.

Referring to FIGS. 12A to 12C, a zoom lens 1 includes a first lens group G1 including a first lens L1 an aperture stop 2 in the order from an object side. The zoom lens 1 further includes a second lens group G2 including a second lens L2 and a third lens group G3 including a third lens L3, which are located closer to an image side than the aperture stop 2. The image pickup apparatus includes the zoom lens 1, an optical filter 3 located at the object side of the zoom lens 1 and formed of an infrared ray cutting filter and a low pass filter, and a solid-state image sensor 4, which is a CMOS, a CCD, or the like. An optical image formed on an image pickup plane after passing through the zoom lens 1 and the optical filter 3 is subjected to photoelectric conversion by the solid-state image sensor 4 and then converted into an image signal by predetermined processing.

The zoom lens according to the third exemplary embodiment of the present invention is a 3-group-3-element zoom lens of the negative-positive-positive type.

The configuration of the zoom lens according to the third exemplary embodiment is illustrated in Table 3.

The first lens L1 is a negative meniscus lens of which a concave surface is oriented to the image side, in which an entrance surface S11 is formed of a spherical surface, and an exit surface S12 is formed of an aspherical surface. The first lens L1 alone forms the first lens group G1. The second lens L2 is a positive meniscus lens of which a concave surface is oriented to the object side, in which each of an entrance surface S21 and an exit surface S22 is formed of an aspherical surface. The second lens L2 alone forms the second lens group G2. The third lens L3 is a bi-convex lens, in which each of an entrance surface S31 and an exit surface S32 is formed of a spherical surface. The third lens L3 alone forms the third lens group G3.

As described above, it is easier to obtain a good optical performance by forming a zoom lens using at least 5 lenses since one positive lens and one negative lens are in general required for each of the first lens group and the second lens group. However, by utilizing the effect of the present invention, it is possible to realize a 3-group-3-element zoom lens in which each of the groups includes a single lens.

The 3-group-3-element zoom lens enables obtaining a thinner image pickup apparatus since it is possible to reduce a lens retraction space by the reduction in number of lenses. Thus, it is possible to reduce a space in an optical axis direction during the lens retraction to about 70% of the conventional size.

Hereinafter, each of the three lenses will be described.

Figure 13A:
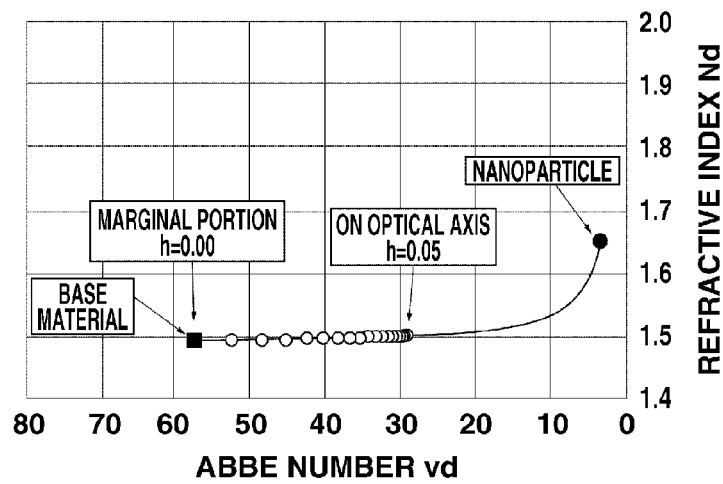
FIG. 13A illustrates a refractive index Abbe number distribution of a first lens according to the third exemplary embodiment of the present invention.
Figure 13B:
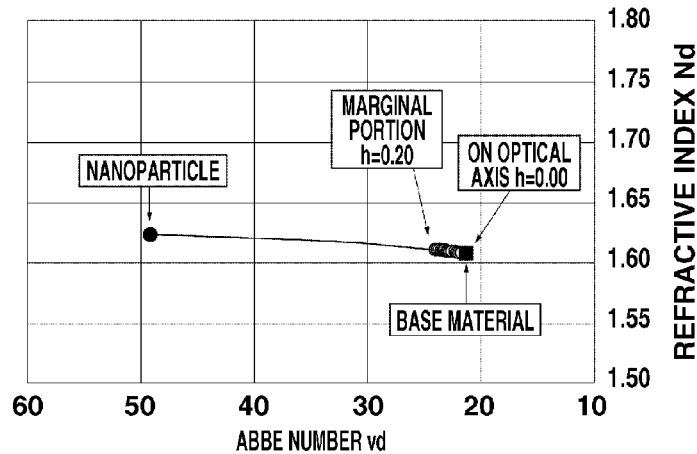
FIG. 13B illustrates a refractive index Abbe number distribution of a second lens according to the third exemplary embodiment of the present invention.
Figure 13C:
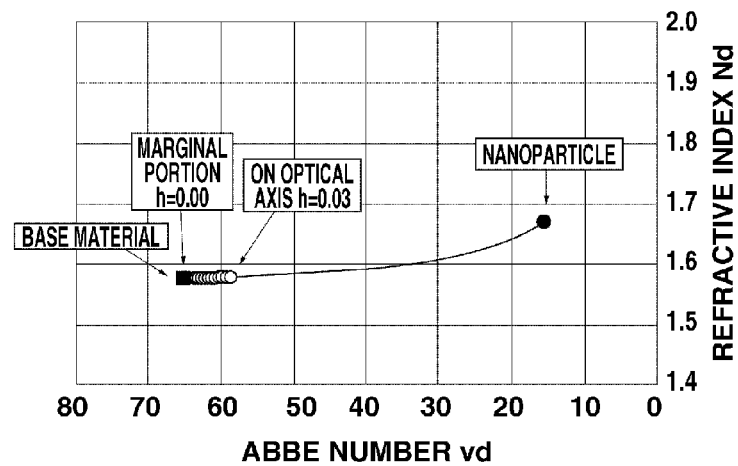
FIG. 13C illustrates a refractive index Abbe number distribution of a third lens according to the third exemplary embodiment of the present invention.

Illustrated in FIG. 13A is a refractive index Abbe number distribution in the first lens L1; illustrated in FIG. 13B is a refractive index Abbe number distribution in the second lens L2; and Illustrated in FIG. 13C is a refractive index Abbe number distribution in the third lens L3 according to the third exemplary embodiment.

The first lens L1 is a lens (optical element) using a nanocomposite material obtained by mixing a base material with nanoparticles having lower Abbe number than the base material and forming a density gradient of the nanoparticles in a radial direction of the lens. The first lens group G1 including the first lens L1 has a negative power, and the density of the nanoparticles of the first lens L1 is lower at a peripheral portion than on an optical axis.

More specifically, for obtaining the first lens L1, the base material (Nd=1.493, vd=57.4) and the nanoparticles (Nd=1.648, vd=3.48) are used. Thus, the first lens L1 is obtained by using the nanocomposite material obtained by mixing the base material with the nanoparticles having the lower Abbe number than the base material.

About 5% of the nanoparticles is mixed with the base material on the optical axis, and the density of the nanoparticles is gradually reduced as a distance from the optical axis increases so that the peripheral portion is formed only of the base material (nanoparticles=0%). Therefore, the density of the nanoparticles is lowered at the peripheral portion than on the optical axis.

Thus, an orthogonally-left-down refractive index Abbe number distribution is formed by forming the density gradient of the nanoparticles in the radial direction of the first lens L1. In this case, refractive index variation DNd is −0.008, and Abbe number variation Dvd is 28.2. Therefore, Dvd/DNd is −3525 to satisfy "Dvd/DNd is less than or equal to −100". Thus, it is possible to form a dispersed distribution type nanocomposite lens suitable for chromatic aberration correction.

The second lens L2 is a lens (optical element) using a nanocomposite material obtained by mixing a base material with nanoparticles having higher Abbe number than the base material and forming a density gradient of the nanoparticles in a radial direction of the lens. The second lens group G2 including the second lens L2 has a positive power, and the density of the nanoparticles of the second lens L2 is lower at a peripheral portion than on an optical axis.

More specifically, for obtaining the second lens L2, the base material (Nd=1.610, vd=24.0) and the nanoparticles (Nd=1.623, vd=49.1) are used. The second lens L2 is obtained by using the nanocomposite material obtained by mixing the base material with the nanoparticles having the higher Abbe number than the base material.

About 20% of the nanoparticles is mixed with the base material on the optical axis, and the density of the nanoparticles is gradually reduced as a distance from the optical axis increases so that the peripheral portion is formed only of the base material (nanoparticles=0%). Therefore, the density of the nanoparticles is lowered at the peripheral portion than on the optical axis.

Thus, an orthogonally-right-down refractive index Abbe number distribution is formed by forming the density gradient of the nanoparticles in the radial direction of the second lens L2. In this case, refractive index variation DNd is −0.003, and Abbe number variation Dvd is −2.8. This lens is inefficient since it is necessary to mix about 20% of the nanoparticles to achieve the Abbe number variation Dvd of −2.8 due to the use of the nanoparticles having the higher Abbe number than the base material.

The third lens L3 is a lens (optical element) using a nanocomposite material obtained by mixing a base material with nanoparticles having lower Abbe number than the base material and forming a density gradient of the nanoparticles in a radial direction of the lens. The third lens group G3 including the third lens L3 has a positive power, and the density of the nanoparticles of the third lens L3 is higher at a peripheral portion than on an optical axis.

More specifically, for obtaining the third lens L3, the base material (Nd=1.578, vd=65.0) and the nanoparticles (Nd=1.668, vd=15.4) are used. The third lens L3 is obtained by using the nanocomposite material obtained by mixing the base material with the nanoparticles having the lower Abbe number than the base material.

The portion on the optical axis is formed only of the base material (nanoparticles=0%), and the density of the nanoparticles is gradually increased as a distance from the optical axis increases so that the density at the peripheral portion is about 3%. Therefore, the density of the nanoparticles is higher at the peripheral portion than on the optical axis.

Thus, an orthogonally-right-up refractive index Abbe number distribution is formed by forming the density gradient of the nanoparticles in the radial direction of the third lens L3. In this case, refractive index variation DNd is +0.003, and Abbe number variation Dvd is −6.4. Therefore, Dvd/DNd is −2133 to satisfy "Dvd/DNd is less than or equal to −100". Thus, it is possible to form a dispersed distribution type nanocomposite lens suitable for chromatic aberration correction.

Figure 14A:
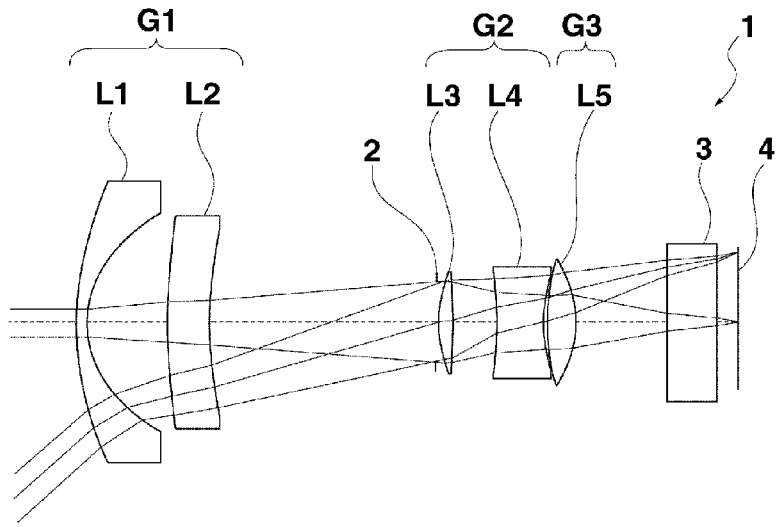
FIG. 14A is a sectional view illustrating an image pickup apparatus according to a fourth exemplary embodiment of the present invention.
Figure 14B:
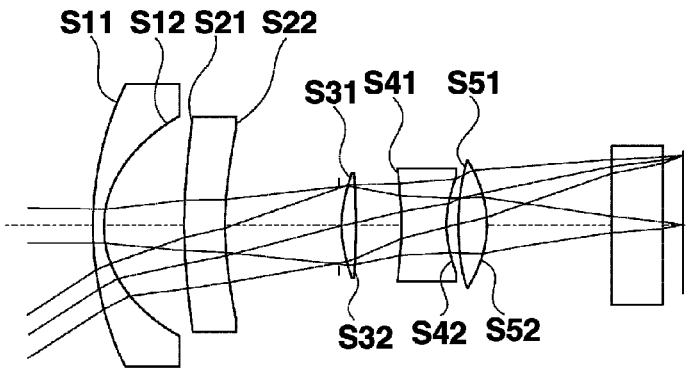
FIG. 14B is a sectional view illustrating the image pickup apparatus according to the fourth exemplary embodiment of the present invention.
Figure 14C:
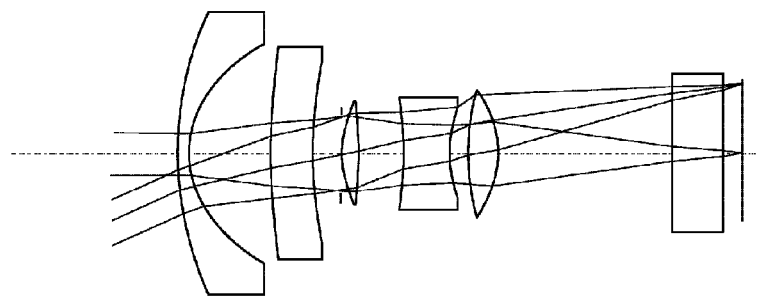
FIG. 14C is a sectional view illustrating the image pickup apparatus according to the fourth exemplary embodiment of the present invention.

FIGS. 14A to 14C are sectional views taken along an optical axis direction illustrating an image pickup apparatus according to a fourth exemplary embodiment of the present invention, when the image pickup apparatus is set at a wide-angle end, a middle focal length, and a telephoto end, respectively.

Referring to FIGS. 14A to 14C, a zoom lens 1 includes a first lens group G1 including a first lens L1 and a second lens L2 and an aperture stop 2 in the order from an object side. The zoom lens 1 further includes a second lens group G2 including a third lens L3 and a fourth lens L4 and a third lens group G3 including a fifth lens L5, which are located closer to an image side than the aperture stop 2. The image pickup apparatus includes the zoom lens 1, an optical filter 3 located at the object side of the zoom lens 1 and formed of an infrared ray cutting filter and a low pass filter, and a solid-state image sensor 4, which is a CMOS, a CCD, or the like. An optical image formed on an image pickup plane after passing through the zoom lens 1 and the optical filter 3 is subjected to photoelectric conversion by the solid-state image sensor 4 and then converted into an image signal by predetermined processing.

The zoom lens according to the fourth exemplary embodiment of the present invention is a 3-group-5-element zoom lens of the negative-positive-positive type.

The configuration of the zoom lens according to the fourth exemplary embodiment is illustrated in Table 4.

The first lens L1 is a negative meniscus lens of which a concave surface is oriented to the image side, in which an entrance surface S11 is formed of a spherical surface, and an exit surface S12 is formed of an aspherical surface. The second lens L2 is a meniscus lens of which a concave surface is oriented to the image side, in which each of an entrance surface S21 and an exit surface S22 is formed of a spherical surface. The first lens L1 and the second lens 12 form the first lens group (first optical element group) G1, and the first lens group G1 has a negative power.

The third lens L3 is a bi-convex lens; in which an entrance surface S31 is formed of an aspherical surface, and an exit surface S32 is formed of a spherical surface. The fourth lens L4 is a bi-concave lens, in which each of an entrance surface S41 and an exit surface S42 is formed of a spherical surface. The third lens L3 and the fourth lens L4 form the second lens group G2, and the second lens group G2 has a positive power.

The fifth lens L5 is a bi-convex lens, in which each of an entrance surface S51 and an exit surface S52 is formed of a spherical surface. The fifth lens L5 alone forms the third lens group G3, and the third lens group G3 has a positive power.

Thus, the zoom lens having a wide field angle represented by 2w=83.4 deg (corresponding to focal length of 24 mm in terms of a 35 mm film) and a zoom ratio of ×2 is formed.

The second lens L2 is a lens (optical element) using a nanocomposite material obtained by mixing a base material with nanoparticles having lower Abbe number than the base material and forming a density gradient of the nanoparticles in a radial direction of the lens. The first lens group G1 including the second lens L2 has a negative power, and the density of the nanoparticles of the second lens L2 is lower at a peripheral portion than on an optical axis.

More specifically, in the second lens L2, PMMA (Nd=1.492, vd=57.2), which is an optical resin, is used as the base material, and titania TiO2 (Nd=2.761, vd=9.5) is used as the nanoparticles. Thus, the second lens is obtained by using the nanocomposite material obtained by mixing the base material with the nanoparticles having the lower Abbe number than the base material as described above.

About 14% (h=0.14) of the nanoparticles of titania is mixed with PMMA serving as the base material at the portion on the optical axis, and the density of the titania nanoparticles is gradually reduced as a distance from the optical axis increases. The density of the titania nanoparticles is reduced to about 3% (h=0.03) at the peripheral portion. Therefore, the density of the nanoparticles is lowered at the peripheral portion than on the optical axis.

Thus, an orthogonally-left-down refractive index Abbe number distribution is formed by forming the density gradient of the nanoparticles in the radial direction of the second lens L2.

Figure 15A:
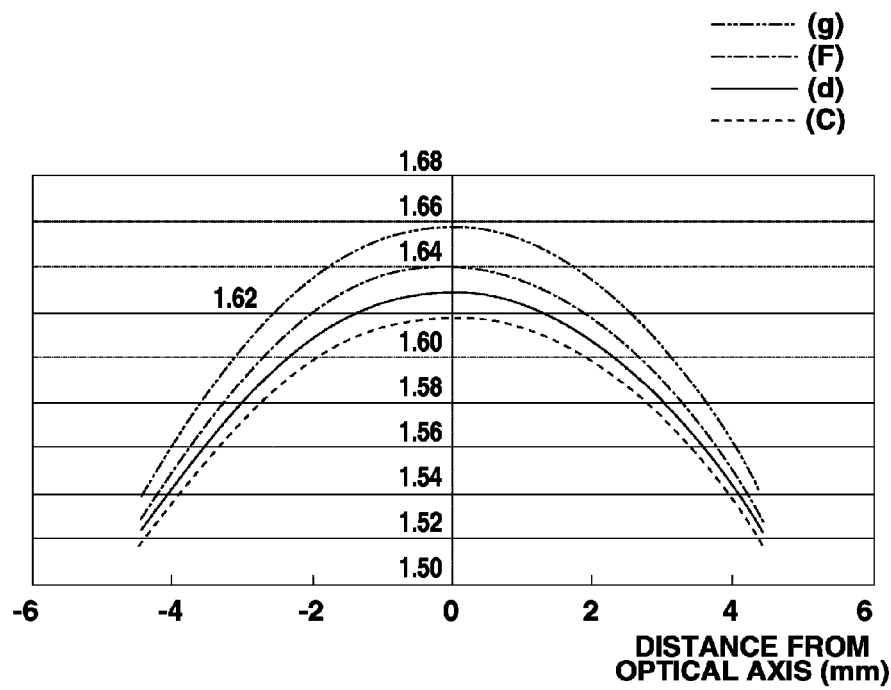
FIG. 15A illustrates a refractive index distribution of a second lens according to the fourth exemplary embodiment of the present invention.
Figure 15B:
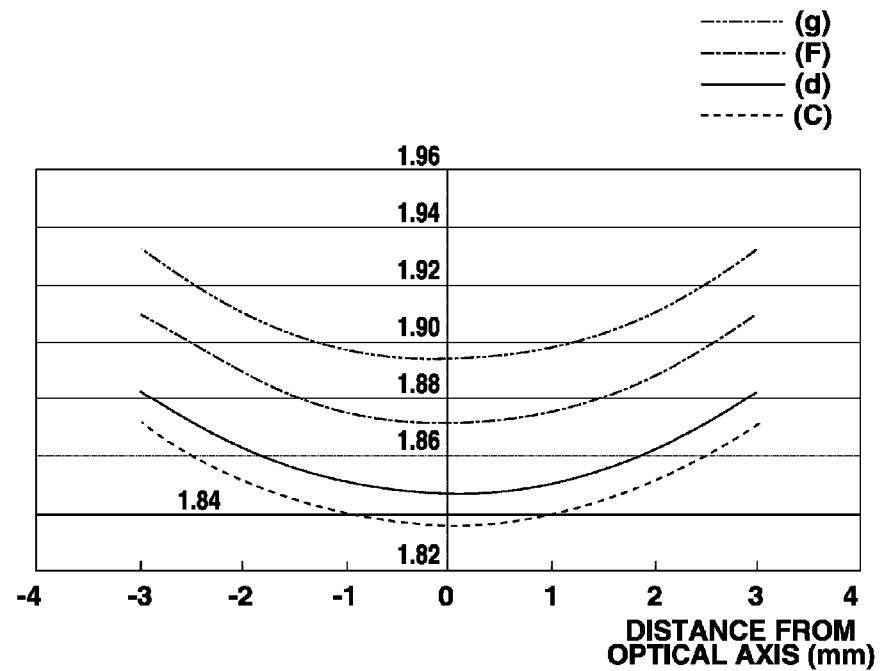
FIG. 15B illustrates a refractive index distribution of a fourth lens according to the fourth exemplary embodiment of the present invention.

Illustrated in FIG. 15A is a refractive index distribution of the second lens L2 according to the fourth exemplary embodiment, and illustrated in FIG. 15B is a refractive index distribution of the fourth lens L4 according to the fourth exemplary embodiment.

FIGS. 15A and 15B illustrate refractive index distributions with respect to typical spectral lines, which are C-line, d-line, F-line, and g-line.

In each of the refractive index distributions with respect to the spectral lines, a portion on the optical axis is the highest, and the refractive index is reduced as the distance from the optical axis increases. As illustrated in Table 4, among the power series expansion formulas illustrated in Formula (5) as expressions for the refractive index distribution, only the terms of the zeroth order and second order are used. Therefore, the distribution is expressed by a quadratic function to the distance r from the optical axis.

Figure 16A:
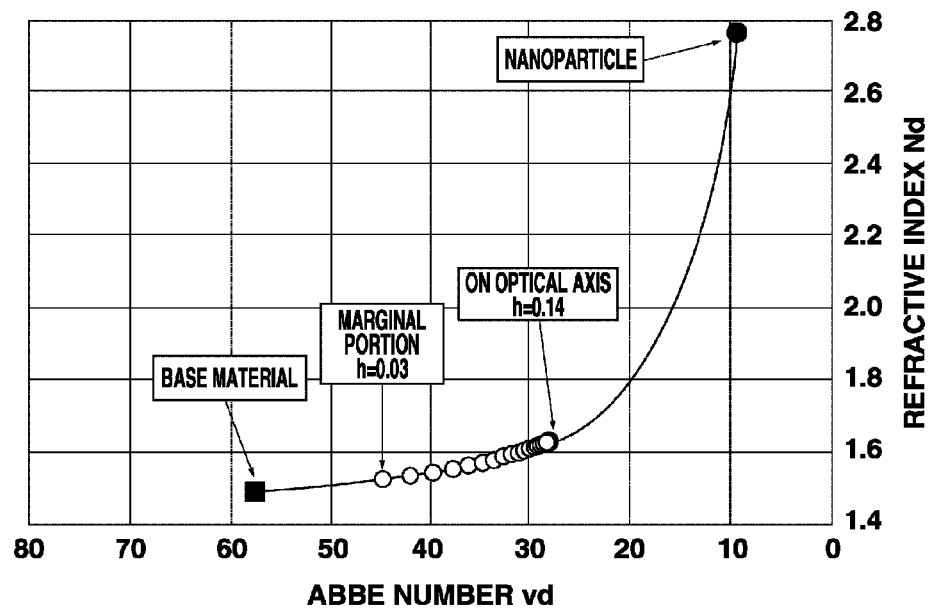
FIG. 16A illustrates a refractive index Abbe number distribution of the second lens according to the fourth exemplary embodiment of the present invention.
Figure 16B:
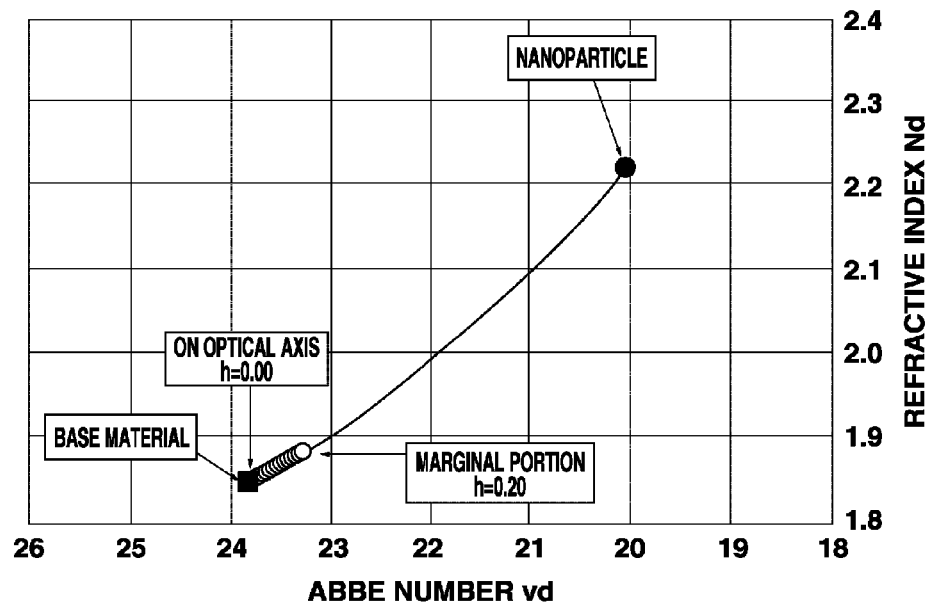
FIG. 16B illustrates a refractive index Abbe number distribution of the fourth lens according to the fourth exemplary embodiment of the present invention.

Illustrated in FIG. 16A is a refractive index Abbe number distribution of the second lens L2 according to the fourth exemplary embodiment, and illustrated in FIG. 16B is a refractive index Abbe number distribution of the fourth lens L4 according to the fourth exemplary embodiment.

Figure 17A:
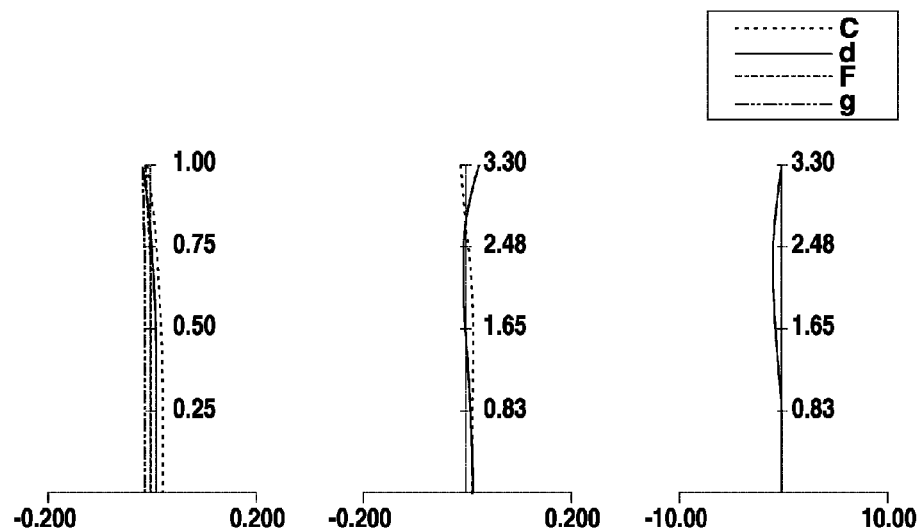
FIG. 17A illustrates longitudinal aberration of a zoom lens according to the fourth exemplary embodiment of the present invention.
Figure 17B:
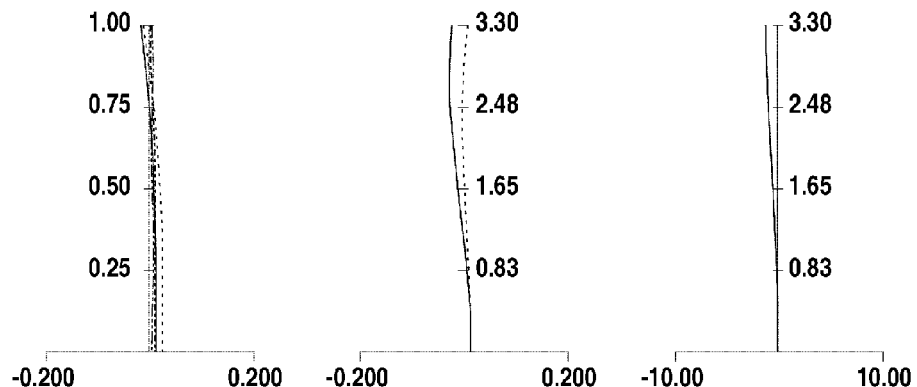
FIG. 17B illustrates longitudinal aberration of the zoom lens according to the fourth exemplary embodiment of the present invention.
Figure 17C:
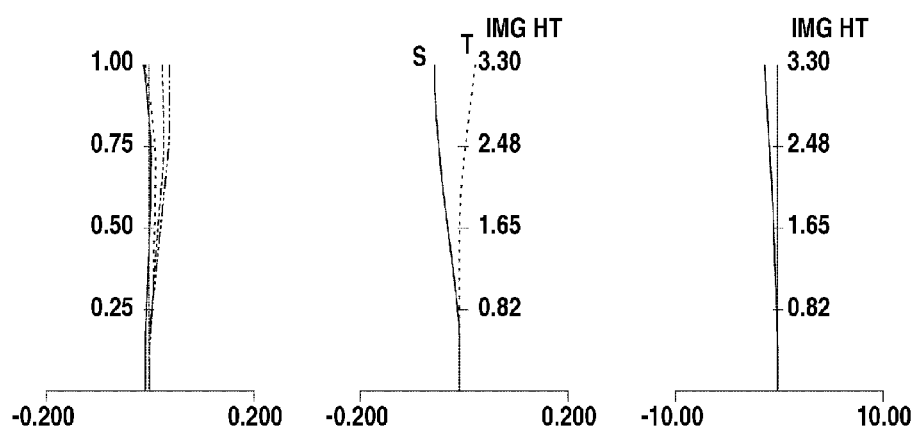
FIG. 17C illustrates longitudinal aberration of the zoom lens according to the fourth exemplary embodiment of the present invention.

Illustrated in FIGS. 17A, 17B, and 17C are a diagram of aberration at a wide-angle end, a diagram of aberration at a middle focal length, and a diagram of aberration at a telephoto end, respectively. In each of the aberration diagrams of FIGS. 17A to 17C, spherical aberration, astigmatism, and distortion are illustrated in this order from left to right.

At each of zoom positions of the wide-angle end, middle focal length, and telephoto end, axial aberration, spherical aberration, astigmatism, curvature of field, and distortion are corrected well to realize a high quality wide-angle zoom lens.

Figure 18A:
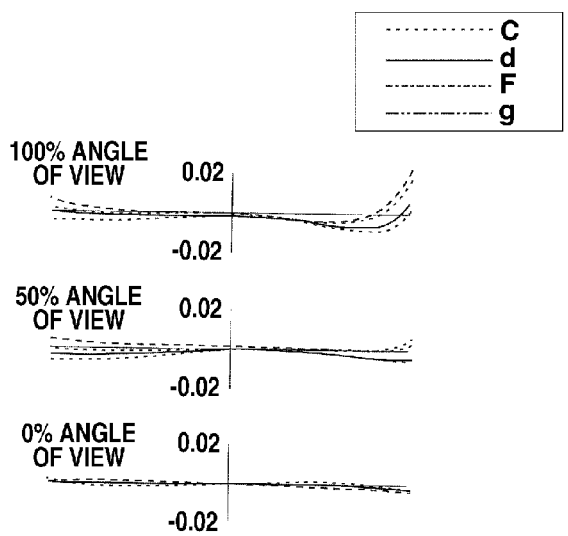
FIG. 18A illustrates lateral aberration of the zoom lens according to the fourth exemplary embodiment of the present invention.
Figure 18B:
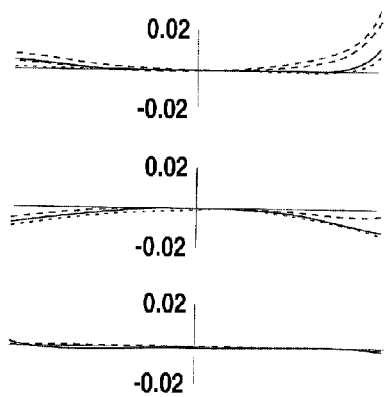
FIG. 18B illustrates lateral aberration of the zoom lens according to the fourth exemplary embodiment of the present invention.
Figure 18C:
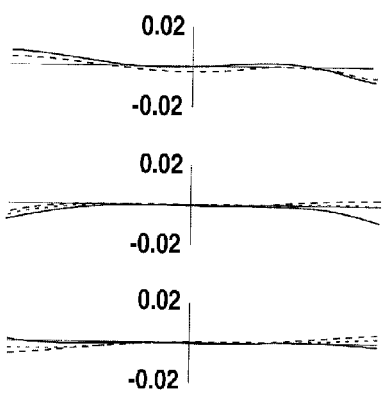
FIG. 18C illustrates lateral aberration of the zoom lens according to the fourth exemplary embodiment of the present invention.

Illustrated in FIGS. 18A, 18B, and 18C are a diagram of lateral aberration at a wide-angle end, a diagram of lateral aberration at a middle focal length, and a diagram of lateral aberration at a telephoto end, respectively.

At each of zoom positions of the wide-angle end, middle focal length, and telephoto end, chromatic aberration of magnification, coma aberration, and curvature of field are corrected well to realize a high quality wide-angle zoom lens.

As illustrated in FIG. 16A, the Abbe number is gradually increased as the distance from the optical axis increases in the distribution in the second lens L2. Thus, it is possible to well correct chromatic aberration generated by the negative power.

Also, the first lens group G1 including the second lens L2 is positioned closer to the object side than the aperture stop 2. Due to the distribution illustrated in FIG. 16A in which the Abbe number is gradually increased as the distance from the optical axis increases, it is possible to well correct chromatic aberration of magnification generated in the entire zoom lens system.

The second lens L2 is a lens obtained by using the nanocomposite material obtained by mixing the base material with the nanoparticles having the lower Abbe number than the base material and forming the density gradient of the nanoparticles in the radial direction of the lens. Thus, the second lens L2 has a configuration that the density of the nanoparticles is gradually reduced along the direction from the optical axis to the peripheral portion.

In the present exemplary embodiment, since the second lens L2 is the Abbe number distribution type lens in which the direction of axial chromatic aberration correction and the direction of correction of chromatic aberration of magnification are identical to each other, the present exemplary embodiment has the advantage of being capable of simultaneously correcting axial chromatic aberration and chromatic aberration of magnification.

The fourth lens L4 is a lens (optical element) using a nanocomposite material obtained by mixing a base material with nanoparticles having lower Abbe number than the base material and forming a density gradient of the nanoparticles in a radial direction of the lens. The second lens group G2 including the fourth lens L4 has a positive power, and the density of the nanoparticles of the fourth lens L4 is higher at a peripheral portion than on an optical axis.

The portion on the optical axis is formed only of the base material (Nd=1.847, vd=23.8), and the density of the nanoparticles (Nd=2.219, vd=20.0) is gradually increased as a distance from the optical axis increases. The density of the nanoparticles is increased to about 10% (h=0.10) at the peripheral portion. Therefore, the density of the nanoparticles is higher at the peripheral portion than on the optical axis.

Thus, an orthogonally-right-up refractive index Abbe number distribution is formed by forming the density gradient of the nanoparticles in the radial direction of the fourth lens L4.

As illustrated in FIG. 16B, the Abbe number is gradually reduced as the distance from the optical axis increases in the distribution in the fourth lens L4. Thus, it is possible to well correct chromatic aberration generated by the positive power.

Also, the second lens group G2 including the fourth lens L4 is positioned closer to the image side than the aperture stop 2. Due to the distribution illustrated in FIG. 16B in which the Abbe number is gradually reduced as the distance from the optical axis increases, it is possible to well correct chromatic aberration of magnification generated, in the entire zoom lens system.

Therefore, the second lens L2 is a lens obtained by using the nanocomposite material obtained by mixing the base material with the nanoparticles having the lower Abbe number than the base material and forming the density gradient of the nanoparticles in the radial direction of the lens to attain the configuration that the density of the nanoparticles is gradually increased along the direction from the optical axis to the peripheral portion.

In the present exemplary embodiment, since the fourth lens L4 is the Abbe number distribution type lens in which the direction of axial chromatic aberration correction and the direction of correction of chromatic aberration of magnification are identical to each other, the present exemplary embodiment has the advantage of being capable of simultaneously correcting axial chromatic aberration and chromatic aberration of magnification.

As described above, it is possible to configure a zoom lens (optical system) in which axial chromatic aberration and chromatic aberration of magnification are corrected well by using an optical element according to any one of the exemplary embodiments of the present invention. Though the optical system is mainly described in the above exemplary embodiments, the above-described optical element itself is a part of the present invention. Also, the optical system (mainly the zoom lens) described in the present exemplary embodiments may be used as a photographic optical system of an image pickup apparatus such as a still camera and a video camera or may be used as a projection optical system of an image projection apparatus such as a projector. Further, the optical system may be used as an observation optical system such as binoculars and a telescope.

TABLE 1

| optical element | surface number | surface type | curvature radius | surface interval | refractive index | Abbe number |
|---|---|---|---|---|---|---|
| first lens | S11 | spherical | 14.427 | 0.50 | 1.88300 | 40.8 |
|  | S12 | aspherical | 4.744 | 3.81 |  |  |
| second lens | S21 | spherical | 36.556 | 2.00 | 1.63150 | 27.8 |
|  | S22 | aspherical | 20.063 | variable | gradient refractive index |  |
| aperature stop |  | spherical | plane surface | 0.10 |  |  |
| third lens | S31 | aspherical | 5.144 | 0.67 | 1.69350 | 53.2 |
|  | S32 | spherical | −39.994 | 2.53 |  |  |
| fourth lens | S41 | spherical | −17.077 | 0.50 | 1.84666 | 23.8 |
|  | S42 | aspherical | 6.229 | variable |  |  |
| fifth lens | S51 | spherical | 12.289 | 1.32 | 1.60311 | 60.6 |
|  | S52 | spherical | −4.897 | variable |  |  |
| optical filter | entrance surface | | plane surface | 2.50 | 1.51633 | 64.1 |
|  | exit surface | | plane surface | 1.00 |  |  |
| image plane |  |  | plane surface |  |  |  |

TABLE 2

| aspheric coefficient | | surface interval | |
|---|---|---|---|
| surface number | S12 | surface number | S22 |
| K | −2.6685E−01 | wide-angle end | 10.14 |
| A | 1.1395E−04 | middle focal length | 4.67 |
| B | −5.9758E−05 | telephoto end | 0.75 |
| C | 0.0000E+00 | | |
| D | 0.0000E+00 | | |
| surface number | S31 | surface number | S42 |
| K | −2.9269E−01 | wide-angle end | 0.22 |
| A | −9.2296E−04 | middle focal length | 0.54 |
| B | −2.8215E−05 | telephoto end | 0.88 |
| C | −2.2105E−05 | | |
| D | 2.9906E−06 | | |
| surface number | S42 | surface number | S52 |
| K | −2.9269E−01 | wide-angle end | 7.22 |
| A | −9.2296E−04 | middle focal length | 8.99 |
| B | −2.8215E−05 | telephoto end | 11.49 |
| C | −2.2105E−05 | | |
| D | 2.9906E−06 | | | gradient refractive index

| optical element | second lens | | |
|---|---|---|---|
| C-line | d-line | F-line | g-line |
| N00 1.6216 | 1.6315 | 1.6443 | 1.6588 |
| N10 −4.6460E−03 | −4.8220E−03 | −5.1380E−03 | −5.4270E−03 |
| N20 0.0000E+00 | 0.0000E+00 | 0.0000E+00 | 0.0000E+00 |
| N30 0.0000E+00 | 0.0000E+00 | 0.0000E+00 | 0.0000E+00 |
| N40 0.0000E+00 | 0.0000E+00 | 0.0000E+00 | 0.0000E+00 |

TABLE 3

| optical element | surface number | surface type | curvature radius | surface interval | refractive index | Abbe number |
|---|---|---|---|---|---|---|
| first lens | S11 | spherical | −2.03414 | 0.50 | 1.84666 | 23.8 |
| | S12 | aspherical | 3.562 | 3.50 | | |
| second lens | S21 | spherical | 9.947 | 15.0 | 1.55508 | 40.4 |
| | S22 | spherical | 18.730 | variable | gradient refractive index | |
| aperture stop | | spherical | plane surface | 0.10 | | |
| third lens | S31 | aspherical | 3.952 | 2.000 | 1.51823 | 58.9 |
| | S32 | spherical | −14.185 | 1.40 | | |
| fourth | S41 | spherical | −17.326 | 0.50 | 1.88300 | 40.8 |
| lens | S42 | aspherical | 9.005 | variable | | |
| fifth lens | S51 | spherical | −52.304 | 0.81 | 1.48749 | 70.2 |
| | S52 | spherical | −3.998 | variable | | |
| optical filter | entrance surface | | plane surface | 2.50 | 1.51633 | 64.1 |
| | exit surface | | plane surface | 1.00 | | |
| image plane | | | plane surface | | | |

TABLE 4

| aspheric coefficient | | surface interval | |
|---|---|---|---|
| surface number | S12 | surface number | S22 |
| K | −1.0640E+00 | wide-angle end | 10.77 |
| A | 7.8975E−04 | middle focal length | 4.69 |
| B | 6.2652E−06 | telephoto end | 0.51 |
| C | −8.7237E−09 | | |
| D | 4.2989E−09 | | |
| surface number | S31 | surface number | S42 |
| K | −8.1596E−01 | wide-angle end | 0.24 |
| A | 1.5221E−04 | middle focal length | 0.51 |
| B | 1.3348E−05 | telephoto end | 0.61 |

TABLE 4-continued

| | |
|---|---|
| C | −3.2161E−06 |
| D | 0.0000E+00 |

| surface number | S42 | surface number | S52 |
|---|---|---|---|
| K | 2.0994E+00 | wide-angle end | 3.73 |
| A | 3.5339E−03 | middle focal length | 4.84 |
| B | −4.0247E−05 | telephoto end | 6.40 |
| C | 5.3420E−06 | | |
| D | 0.0000E+00 | | |

| gradient refractive index | | | | |
|---|---|---|---|---|
| optical element | | first lens | | |
| | C-line | d-line | F-line | g-line |
| N00 | 1.5502 | 1.5551 | 1.5640 | 1.5718 |
| N10 | −5.9400E−04 | −6.5120E−04 | −6.9560E−04 | −7.2970E−04 |
| N20 | 0.0000E+00 | 0.0000E+00 | 0.0000E+00 | 0.0000E+00 |
| N30 | 0.0000E+00 | 0.0000E+00 | 0.0000E+00 | 0.0000E+00 |
| N40 | 0.0000E+00 | 0.0000E+00 | 0.0000E+00 | 0.0000E+00 |

TABLE 5

| optical element | surface number | surface type | curvature radius | surface interval | refractive index | Abbe number |
|---|---|---|---|---|---|---|
| first lens | S11 | spherical | 22.260 | 2.00 | 1.50021 | 29.1 |
| | S12 | aspherical | 3.854 | variable | | |
| aperture stop | | spherical | plane surface | 0.70 | | |
| second lens | S21 | aspherical | 3.717 | 1.79 | 1.61004 | 24.0 |
| | S22 | aspherical | 3.568 | variable | | |
| third lens | S31 | spherical | 43.104 | 1.79 | 1.57772 | 65.0 |
| | S32 | spherical | −4.490 | variable | | |
| optical filter | entrance surface | | plane surface | 2.50 | 1.51633 | 64.1 |
| | exit surface | | plane surface | 0.93 | | |
| image plane | | | plane surface | | | |

TABLE 6

| aspheric coefficient | | surface interval | |
|---|---|---|---|
| surface number | S12 | surface number | S12 |
| K | −2.6685E−01 | wide-angle end | 9.00 |
| A | 1.1395E−04 | middle focal length | 4.65 |
| B | −5.9758E−05 | telephoto end | 1.20 |
| C | 0.0000E+00 | | |
| D | 0.0000E+00 | | |
| surface number | S21 | surface number | S22 |
| K | −2.9269E−01 | wide-angle end | 0.70 |
| A | −9.2296E−04 | middle focal length | 1.05 |
| B | −2.8215E−04 | telephoto end | 1.82 |
| C | −2.2105E−05 | | |
| D | 2.9906E−06 | | |
| surface number | S22 | surface number | S32 |
| K | −2.9269E−01 | wide-angle end | 7.22 |
| A | −9.2296E−04 | middle focal length | 8.99 |
| B | −2.8215E−04 | telephoto end | 11.49 |
| C | −2.2105E−05 | | |
| D | 2.9906E−06 | | |

TABLE 6-continued

| gradient refractive index | | | |
|---|---|---|---|
| optical element | | first lens | |
| | C-line | d-line | F-line |
| N00 | 1.4894 | 1.5002 | 1.5062 |
| N10 | −1.0000E−04 | −3.7040E−04 | −4.7800E−04 |
| N20 | 0.0000E+00 | 0.0000E+00 | 0.0000E+00 |
| N30 | 0.0000E+00 | 0.0000E+00 | 0.0000E+00 |
| N40 | 0.0000E+00 | 0.0000E+00 | 0.0000E+00 |
| optical element | | second lens | |
| | C-line | d-line | F-line |
| N00 | 1.5923 | 1.6100 | 1.6177 |
| N10 | −2.5850E−03 | −2.2700E−03 | −2.0230E−03 |
| N20 | 0.0000E+00 | 0.0000E+00 | 0.0000E+00 |
| N30 | 0.0000E+00 | 0.0000E+00 | 0.0000E+00 |
| N40 | 0.0000E+00 | 0.0000E+00 | 0.0000E+00 |
| optical element | | third lens | |
| | C-line | d-line | F-line |
| N00 | 1.5716 | 1.5777 | 1.5805 |
| N10 | 7.7300E−04 | 1.1180E−03 | 1.3410E−03 |
| N20 | 0.0000E+00 | 0.0000E+00 | 0.0000E+00 |
| N30 | 0.0000E+00 | 0.0000E+00 | 0.0000E+00 |
| N40 | 0.0000E+00 | 0.0000E+00 | 0.0000E+00 |

TABLE 7

| optical element | surface number | surface type | curvature radius | surface interval | refractive index | Abbe number |
|---|---|---|---|---|---|---|
| first lens | S11 | spherical | 15.859 | 0.50 | 1.88300 | 40.8 |
| | S12 | aspherical | 4.685 | 4.00 | | |
| second lens | S21 | spherical | 39.267 | 2.00 | 1.62873 | 28.0 |
| | S22 | spherical | 20.127 | variable | gradient refractive index | |
| aperture stop | | spherical | plane surface | 0.10 | | |
| third lens | S31 | aspherical | 5.620 | 0.76 | 1.69350 | 50.8 |
| | S32 | spherical | −25.451 | 2.12 | | |
| fourth lens | S41 | spherical | −18.774 | 2.26 | 1.84666 | 23.8 |
| | S42 | aspherical | 7.177 | variable | gradient refractive index | |

TABLE 7-continued

| optical element | surface number | surface type | curvature radius | surface interval | refractive index | Abbe number |
|---|---|---|---|---|---|---|
| fifth lens | S51 | spherical | 12.864 | 1.44 | 1.60311 | 60.7 |
|  | S52 | spherical | −5.247 | variable |  |  |
| optical filter | entrance surface |  | plane surface | 2.50 | 1.51633 | 64.1 |
|  | exit surface |  | plane surface | 1.00 |  |  |
| image plane |  |  | plane surface |  |  |  |

TABLE 8

| aspheric coefficient | | surface interval | |
|---|---|---|---|
| surface number | S12 | surface number | S22 |
| K | −9.8214E−01 | wide-angle end | 11.03 |
| A | 6.2507E−04 | middle focal length | 5.41 |
| B | 9.1572E−06 | telephoto end | 1.38 |
| C | −6.6555E−08 | | |
| D | 5.9704E−09 | | |
| surface number | S31 | surface number | S42 |
| K | −1.1907E+00 | wide-angle end | 0.20 |
| A | 2.8802E−04 | middle focal length | 0.55 |
| B | −6.7033E−06 | telephoto end | 0.89 |
| C | 0.0000E+00 | | |
| D | 0.0000E+00 | | |
| surface number | S42 | surface number | S52 |
| K | 1.5464E+00 | wide-angle end | 4.40 |
| A | 9.7810E−04 | middle focal length | 6.06 |
| B | −8.0919E−05 | telephoto end | 8.39 |
| C | 0.0000E+00 | | |
| D | 0.0000E+00 | | |

| gradient refractive index | | | | |
|---|---|---|---|---|
| optical element | | second lens | | |
| | C-line | d-line | F-line | g-line |
| N00 | 1.6184 | 1.6287 | 1.6408 | 1.6577 |
| N10 | −5.1110E−03 | −5.3030E−03 | −5.6530E−03 | −5.9850E−03 |
| N20 | 0.0000E+00 | 0.0000E+00 | 0.0000E+00 | 0.0000E+00 |
| N30 | 0.0000E+00 | 0.0000E+00 | 0.0000E+00 | 0.0000E+00 |
| N40 | 0.0000E+00 | 0.0000E+00 | 0.0000E+00 | 0.0000E+00 |
| optical element | | fourth lens | | |
| | C-line | d-line | F-line | g-line |
| N00 | 1.8365 | 1.8467 | 1.8721 | 1.8942 |
| N10 | 3.9010E−03 | 3.9820E−03 | 4.1620E−03 | 4.2120E−03 |
| N20 | 0.0000E+00 | 0.0000E+00 | 0.0000E+00 | 0.0000E+00 |
| N30 | 0.0000E+00 | 0.0000E+00 | 0.0000E+00 | 0.0000E+00 |
| N40 | 0.0000E+00 | 0.0000E+00 | 0.0000E+00 | 0.0000E+00 |

With the use of an optical system (optical apparatus) according to any one of the exemplary embodiments of the present invention, it is possible to provide an optical system or optical apparatus in which chromatic aberration is well reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-096140 filed Apr. 10, 2009, which is hereby incorporated by reference herein in its entirety.

The invention claimed is:

1. An optical system comprising a positive lens unit, wherein the positive lens unit includes an optical element containing a base material and minute particles that are mixed with the base material and have Abbe number that is lower than that of the base material, and wherein the minute particles are higher in density at a peripheral portion of the optical element than on an optical axis of the optical element.

2. The optical system according to claim 1, wherein an optical element other than an optical element having a strongest refractive power among a plurality of optical elements included in the optical system is the optical element formed by mixing the minute particles with the base material.

3. The optical system according to claim 1, wherein a power of the optical element containing the minute particles that have Abbe number that is lower than that of the base material and a power of the lens unit including the optical element containing the minute particles that have Abbe number that is lower than that of the base material have opposite signs.

4. The optical element according to claim 1, satisfying a condition that Dvd/DNd is less than or equal to −100 is satisfied where DNd is a difference between a refractive index on the optical axis and a refractive index at the peripheral portion of the optical element, and Dvd is a difference between Abbe number on the optical axis and Abbe number at the peripheral portion of the optical element.

5. The optical system according to claim 1, wherein the minute particles contained in the optical element have a volume ratio of 50% or less in the optical element.

6. The optical system according to claim 1, wherein the optical element is located in a lens unit that is located closest to the object side among a plurality of lens units included in the optical system.

7. An image pickup apparatus comprising:
an image sensor; and
the optical system according to claim 1, the optical element being configured to guide a light flux from an object to the image sensor.

8. An optical system comprising a negative lens unit,
wherein the negative lens unit includes an optical element containing a base material and minute particles that are mixed with the base material and have Abbe number that is lower than that of the base material, and
wherein the minute particles are lower in density at a peripheral portion of the optical element than on an optical axis of the optical element.

9. An image pickup apparatus comprising:
an image sensor; and
the optical system according to claim 8, the optical element being configured to guide a light flux from an object to the image sensor.

10. An optical system comprising a stop, a first lens unit located closer to an object side than the stop, and a second lens unit located closer to an image side than the stop,
wherein the first lens unit includes an optical element containing a base material and minute particles that are mixed with the base material and have Abbe number that is lower than that of the base material, and
wherein the minute particles are lower in density at a peripheral portion of the optical element than on an optical axis of the optical element.

11. An image pickup apparatus comprising:
an image sensor; and
the optical system according to claim 10, the optical element being configured to guide a light flux from an object to the image sensor.

12. An optical system comprising a stop, a first lens unit located closer to an object side than the stop, and a second lens unit located closer to an image side than the stop,
wherein the second lens unit includes an optical element containing a base material and minute particles that are mixed with the base material and have Abbe number that is lower than that of the base material, and
wherein the minute particles are higher in density at a peripheral portion of the optical element than on an optical axis of the optical element.

13. An image pickup apparatus comprising:
an image sensor; and
the optical system according to claim 12, the optical element being configured to guide a light flux from an object to the image sensor.

* * * * *